United States Patent
Lee

(10) Patent No.: US 11,363,831 B2
(45) Date of Patent: Jun. 21, 2022

(54) METHOD AND SYSTEM FOR FREEZING RELATED SEPARATION PROCESSES UTILIZING BIOGENIC ICE NUCLEATION PROTEINS

(71) Applicant: RUTGERS, the State University of New Jersey, Piscataway, NJ (US)

(72) Inventor: Tung-Ching Lee, Princeton, NJ (US)

(73) Assignee: RUTGERS, the State University of New Jersey, Piscataway, NJ (US)

( * ) Notice: Subject to any disclaimer, the term of this patent is extended or adjusted under 35 U.S.C. 154(b) by 519 days.

(21) Appl. No.: 16/275,888

(22) Filed: Feb. 14, 2019

(65) Prior Publication Data

US 2019/0261655 A1 Aug. 29, 2019

Related U.S. Application Data

(60) Provisional application No. 62/634,274, filed on Feb. 23, 2018.

(51) Int. Cl.

| | |
|---|---|
| *A23B 7/024* | (2006.01) |
| *A23C 1/08* | (2006.01) |
| *A23C 3/04* | (2006.01) |
| *A23L 2/42* | (2006.01) |
| *C02F 1/22* | (2006.01) |
| *C02F 103/08* | (2006.01) |
| *A23B 7/055* | (2006.01) |
| *A23L 3/375* | (2006.01) |
| *A23L 3/44* | (2006.01) |
| *B01D 21/26* | (2006.01) |

(52) U.S. Cl.
CPC .............. *A23L 3/375* (2013.01); *A23B 7/024* (2013.01); *A23B 7/055* (2013.01); *A23C 1/08* (2013.01); *A23C 3/04* (2013.01); *A23L 2/42* (2013.01); *A23L 3/44* (2013.01); *B01D 21/262* (2013.01); *C02F 1/22* (2013.01); *A23V 2002/00* (2013.01); *C02F 2103/08* (2013.01)

(58) Field of Classification Search
CPC ....... B01D 21/262; C02F 1/22; C02F 2103/08
See application file for complete search history.

(56) References Cited

U.S. PATENT DOCUMENTS

2016/0121268 A1* 5/2016 Avery ................ C02F 1/22
210/714

OTHER PUBLICATIONS

Watanabe, Michiko, et al. "Freeze concentration of some foodstuffs using ice nucleation-active bacterial cells entrapped in calcium alginate gel." Agricultural and biological chemistry 53.10 (1989): 2731-2735. (Year: 1989).*
Jue Jin, et al.: Improved freeze drying efficiency by ice nucleation proteins with ice morphology modification: Food Research International 106 (2018) 90-97.
Jue Jin, et al.: A Novel Approach To Improve the Efficiency of Block Freeze Concentration Using Ice Nucleation Proteins with Altered Ice Morphology: Journal of Agricultural and Food Chemistry: 2017, 65, 2373-2382.

* cited by examiner

*Primary Examiner* — Bradley R Spies
(74) *Attorney, Agent, or Firm* — Ladas & Parry LLP

(57) ABSTRACT

A novel method for freeze-related separations, involving the combination of water with a selected concentration of biogenic ice nucleation proteins, freezing the combination, and separating the ice, potentially via centrifugation or sublimation. In some instances, the freezing conditions and the concentration of the at least one biogenic ice nucleation protein are selected such that the aqueous solution, upon freezing, forms a lamellar ice crystal structure having at least one property selected from the group consisting of a solute inclusion volume at least 30% smaller than in the first material alone, a hydraulic diameter at least 30% larger than in the first material alone, an inclusion width that is less than 10% of a crystal dimension, a hydraulic diameter that is less more than 1.5 times that of an inclusion width, a deviation of crystal orientation angle in the transverse direction of less than 45 degrees, an ice crystal length in the transverse direction that is at least 10% larger than in the first material alone, and a length of the ice crystal structure in the longitudinal direction that is at least 10% larger than in the first material alone. The use of these structures result in a significant efficiency improvement and energy savings.

21 Claims, 17 Drawing Sheets

| sample | cycle | initial concn (g/L) | initial vol (mL) | concn of methed ion (g/L) | methed ion vol (mL) | desalination rate (%) | yield (%) |
|---|---|---|---|---|---|---|---|
| control | 1 | 33.3 | 40 | 6.5 ± 2.31a | 24.9 ± 2.9c | 80.50 ± 6.93d | 62.25 ± 7.13c |
| | 2 | 6.5 | 40 | 1.8 ± 0.18bc | 35.4 ± 0.8a | 72.07 ± 2.72c | 88.44 ± 1.86a |
| | 3 | 1.8 | 40 | 0.90 ± 0.05bc | 36.4 ± 0.6a | 50.08 ± 2.84c | 93.00 ± 1.57a |
| | 4 | 0.9 | 40 | 0.45 ± 0.05c | 37.3 ± 0.3a | 50.02 ± 5.86ab | 92.93 ± 0.72a |
| ENPs | 1 | 33.3 | 40 | 3.3 ± 0.38b | 20.8 ± 0.6d | 80.99 ± 1.14e | 51.88 ± 1.44d |
| | 2 | 3.33 | 40 | 0.94 ± 0.16bc | 29.8 ± 2.9b | 71.82 ± 4.88c | 74.38 ± 7.23b |
| | 3 | 0.94 | 40 | 0.38 ± 0.03c | 33.9 ± 1.0a | 59.88 ± 3.67b | 84.69 ± 2.58a |

FIG. 6

| step | sample | control | INPs |
|---|---|---|---|
| freezing | cooling output (kW) | 0.2 | 0.1 |
| | freezing time (h) | 1 | 1 |
| | energy cost (kWh) | 0.2 | 0.1 |
| separation | maximum power required for centrifuge used in this study at 14,000 rpm is 2.0 kW | | |
| | centrifuge speed (rpm) | 4000 | 2000 |
| | centrifuge power (kW) | 0.0467 | 0.0058 |
| | centrifuge time (h) | 0.3333 | 0.3333 |
| | energy cost (kWh) | 0.0156 | 0.0019 |
| desalination | energy of each cycle (kWh) | 0.2156 | 0.1019 |
| | cycle number | 4 | 3 |
| | total energy cost (kWh) | 0.8623 | 0.3058 |
| | final yield ($10^{-3}$ $m^3$) | 0.7448 | 0.5228 |
| | final energy cost (kWh/$m^3$) | 1157.7 | 585.0 |

FIG. 7

| sample | growth height (mm) | crystal dimension (mm) | inclusion width (mm) | hydraulic diameter (mm) |
|---|---|---|---|---|
| control | 11.6 | 3.0 ± 0.5a | 0.75 ± 0.17a | 0.66 ± 0.15a |
|  | 17.0 | 5.2 ± 0.8b | 0.76 ± 0.20a | 0.69 ± 0.18a |
|  | 24.7 | 6.3 ± 0.8c | 0.79 ± 0.18a | 0.74 ± 0.16a |
| INPs | 8.6 | 8.4 ± 1.1d | 0.54 ± 0.08b | 1.02 ± 0.15b |
|  | 20.0 | 10.8 ± 0.5e | 0.63 ± 0.14ab | 1.19 ± 0.22c |
|  | 24.2 | 12.2 ± 1.7f | 0.63 ± 0.11ab | 1.20 ± 0.21c |

[a]Values with no common letters are significantly different ($P < 0.05$).

FIG. 11

| INP concn (mg/mL) | crystal dimension (mm) | inclusion width (mm) | hydraulic diameter (mm) |
|---|---|---|---|
| $0.00 \times 10^{0}$ | 2.79 ± 0.12a | 0.61 ± 0.01a | 0.55 ± 0.01a |
| $1.00 \times 10^{-6}$ | 3.02 ± 0.48a | 0.83 ± 0.07b | 0.72 ± 0.06b |
| $1.00 \times 10^{-4}$ | 4.19 ± 0.28b | 0.82 ± 0.06b | 0.74 ± 0.05b |
| $1.00 \times 10^{-3}$ | 11.02 ± 1.12c | 0.54 ± 0.06a | 1.02 ± 0.02c |

[a]Values with no common letters are significantly different ($P < 0.05$).

FIG. 12

| expt group | tested variable | variable levels | | |
|---|---|---|---|---|
| | | INP concentration (mg/mL) | freezing temperature (°C) | centrifuge condition (mins @ rpm) |
| 1 | INP concentration | 0, $10^{-6}$, $10^{-4}$, $10^{-2}$ | −18 | 10 @ 500 |
| 2 | freezing temperature | $10^{-2}$ | −18, −13, −8 | 10 @ 500 |
| 3 | centrifuge time | $10^{-2}$ | −18 | 5, 10, 15, 20, 30 @ 500 |
| 4 | centrifuge speed | $10^{-2}$ | −18 | 10 @ 500, 1000, 2000, 4000 |
| 5 | DC* of control | 0 | −18 | 10 @ 4000 |
| 6 | DC of INPs | $10^{-2}$ | −8 | 10 @ 2000 |

*DC represents desublimation cycle.

FIG. 14

METHOD AND SYSTEM FOR FREEZING RELATED SEPARATION PROCESSES UTILIZING BIOGENIC ICE NUCLEATION PROTEINS

RELATED APPLICATION

This application claims priority from provisional application 62/634,274 filed on Feb. 23, 2018.

BACKGROUND

Freezing related food processing offers the advantages of high quality nutritious foods with long term storage life. Among these freezing processes, technologies like freeze concentration and freeze drying are well-established food preservation methods. By freezing foods and separating the ice from the frozen matrices, freeze concentration and freeze-drying processes are frequently used for producing valuable intermediate ingredients or final products. Due to the low temperature processing environment, these technologies can successfully preserve taste, color, aroma and nutritional values of the original products. For example, freeze concentration process shows tremendous advantages in concentrating aroma-rich liquid foods, such as fruit juice, coffee and tea.

Freeze concentration is a separation process to remove water from a product. During this process, water is frozen into solid ice crystals and separated from a concentrated solution. Over the past decades, freeze concentration has achieved great success in industrial applications for preserving volatile flavors and heat-sensitive nutrients in concentrated products due to its low-temperature processing environment. (See Sanchez, J. et al, Review. Freeze concentration in the fruit juices industry. Food Sci. Technol. Int. 2009, 15, 303-315; Sanchez, J. et al, Review: Freeze concentration technology applied to dairy products. Food Sci. Technol. Int. 2011, 17, 5-13). In addition, due to its lower energy cost as compared to evaporation-based techniques, freeze concentration was recently suggested as a potential application for desalination to help address water shortages for both daily human consumption and food production. (See Fujioka, R. et al, Application of progressive freeze-concentration for desalination. Desalination 2013, 319, 33-37; Luo, C. S. et al, Experimental study on factors affecting the quality of ice crystal during the freezing concentration for the brackish water. Desalination 2010, 260, 231-238).

Further, the freeze-drying process has been favored for dehydrating perishable materials, such as proteins, enzymes, microorganisms and other bio-active compounds. Although succeeded in maintaining high product quality and extending shelf life, these freezing technologies are relatively expensive processes as compared to other separation processes. The relatively high cost comes from two aspects of the processes. One is the equipment investment for the ice formation during freezing step. (See Otero, L. et al, Pressure-shift nucleation: a potential tool for freeze concentration of fluid foods.

Innovative Food Sci. Emerging Technol. 2012, 13, 86-99). The other one is the energy cost related to the subsequent separation step, such as complicated mechanical separation of ice crystals from liquid concentrate or long duration of ice crystals sublimation from the frozen products (Geidobler & Winter, 2013; Spicer, 1974).

Recently, another type of freeze concentration method called block freeze concentration was developed to freeze water completely or partially, on a cold surface, into a porous ice block. Then the concentrate is removed from this ice block through gravity or other external forces. (See Petzold, G., et al, Block freeze concentration assisted by centrifugation applied to blueberry and pineapple juices. Innovative Food Sci. Emerging Technol. 2015, 30, 192-197; Moreno, F. L. et al, Effect of separation and thawing mode on block freeze-concentration of coffee brews. Food Bioprod. Process. 2013, 91, 396-402). This method significantly reduced the initial capital cost with its simplified crystallization step. (See Sanchez (2011)). However, the concentration efficiency of current block freeze concentration is not comparable to suspension freeze concentration. (See Petzold).

SUMMARY OF THE INVENTION

The present invention is directed to a lamellar ice crystal structure and a method for using the structure, thereby increasing efficiencies in the various freeze related separation processes. For example, by applying INPs, the total drying time of freeze drying is reduced significantly. One embodiment comprises a lamellar ice crystal structure comprising a combination of water, at least one solute, and at least one biogenic ice nucleation protein (INP), where the concentration of the INP has been selected such that resulting lamellar ice crystal is characterized by specific desirable properties, including but not limited to a hydraulic diameter at least 30% larger than an aqueous solution without the at least one biogenic ice nucleation protein, and/or a solute inclusion volume at least 30% smaller than an aqueous solution without the at least one biogenic ice nucleation protein. The solute may be a salt. The lamellar ice crystal structure may also advantageously have an inclusion width is less than 10% of a crystal dimension, or a hydraulic diameter is at least 1.5 times an inclusion width.

Another embodiment comprises a method for freeze-concentrating an aqueous solution using a lamellar ice crystal structure, including combining an aqueous solution with at least one biogenic ice nucleation protein; and freezing the combination to form a matrix of ice crystals, where the freezing conditions and the concentration of the at least one biogenic ice nucleation protein are selected such that the aqueous solution, upon freezing, forms a lamellar ice crystal structure characterized by specific desirable properties, including but not limited to a hydraulic diameter at least 30% larger than an aqueous solution without the at least one biogenic ice nucleation protein, and/or a solute inclusion volume at least 30% smaller than an aqueous solution without the at least one biogenic ice nucleation protein.

Another embodiment comprises a method for desalination, comprising the steps of providing an aqueous solution and providing an amount of at least one biogenic ice nucleation protein selected to increase a freezing temperature sufficient to yield an n-cycle process when combined with the aqueous solution, where n is the number of cycles required to alter the starting concentration to at least a predetermined level, and freezing the combination of the aqueous solution and the at least one biogenic ice nucleation protein. In this method, the combined solution forms a lamellar ice crystal structure characterized by specific desirable properties, including but not limited to a hydraulic diameter at least 30% larger than an aqueous solution without the at least one biogenic ice nucleation protein, and/or a solute inclusion volume at least 30% smaller than an aqueous solution without the at least one biogenic ice nucleation protein.

An alternate method for desalination is also provided, comprising the steps of providing an aqueous solution and an amount of at least one biogenic ice nucleation protein selected to produce an ice morphology sufficient to yield an n-cycle process when combined with the aqueous solution, where n is the number of cycles required to alter the starting concentration to at least a predetermined level, and freezing the combination of the aqueous solution and the at least one biogenic ice nucleation protein. In this method, the combined solution forms a lamellar ice crystal structure characterized by specific desirable properties, including but not limited to a hydraulic diameter at least 30% larger than an aqueous solution without the at least one biogenic ice nucleation protein, and/or a solute inclusion volume at least 30% smaller than an aqueous solution without the at least one biogenic ice nucleation protein.

The methods may also involve utilizing a freezing temperature that is at least 10 degrees C. higher than the freezing temperature without the at least one biogenic ice nucleation protein, centrifuging a partially frozen solution comprising at least one lamellar ice crystal structure, removing at least one ice crystal structure from the aqueous solution, and/or repeating the cycle of freezing and separating steps until the concentration of the solute in the ice crystal structure or in the aqueous solution has reached a desired concentration. Advantageously, the conditions used in these methods may be advantageously selected such that the total number of cycles is at least one less than total number of cycles required to concentrate the solute to the same concentration without the use of a biogenic ice nucleation protein.

BRIEF DESCRIPTION OF THE DRAWINGS

FIG. 6 is a table comparing Desalination Cycles between Control Samples frozen each cycle at −18° C. and centrifuged at 4000 rpm for 10 min, and INP samples frozen each cycle at −8° C. and centrifuged at 2000 rpm for 10 min. (Values with no common letter are significantly different ($P<0.05$)).

FIG. 7 is a table comparing Energy Cost between Control and INP Samples for Obtaining Fresh Water.

FIG. 11 is a table indicating the effect of INPs on Hydraulic Diameter at Different Growth Heights (Values with no common letter are significantly different ($P<0.05$)).

FIG. 12 is a table indicating the effect of INP concentration on the morphology of Frozen Seawater Matrix. (Values with no common letter are significantly different ($P<0.05$)).

FIG. 14 is a table describing an experimental design for investigating the effect of INPs on freeze concentration efficiency under different variables.

DETAILED DESCRIPTION OF THE INVENTION

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

The present invention is drawn to method and composition of matter for freeze concentration and related processes, including but not limited to desalination, that utilize biogenic ice nucleation proteins (INPs). The method results in a novel lamellar ice crystal structure, formed from an aqueous solution and at least one biogenic ice nucleation protein, where the concentration of the biogenic ice nucleation protein has been selected such that when frozen, the resulting ice crystal structure is characterized by specific desirable properties. Specifically, preferred embodiments have a hydraulic diameter at least 30% larger than an aqueous solution without the at least one biogenic ice nucleation protein, and/or having a solute inclusion volume at least 30% smaller than an aqueous solution without the at least one biogenic ice nucleation protein.

Freeze concentration processes are often used in the food industry, including but not limited to freeze concentration of fruit juices, milk, wine, beer, coffee, and teas.

Figure 1A:
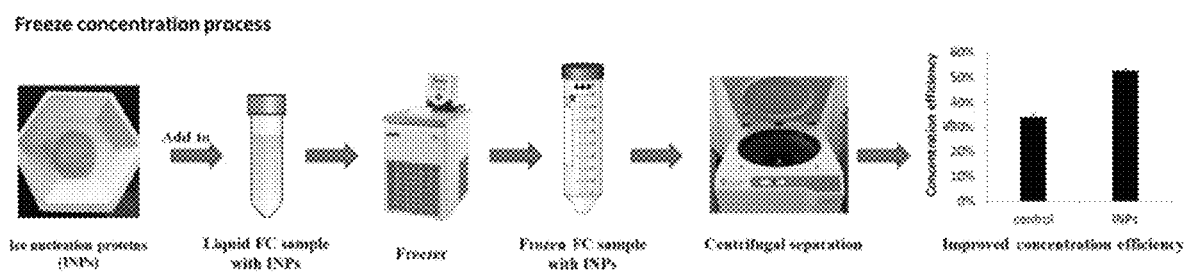
FIGS. 1A and 1B are pictorial flowcharts depicting embodiments of a freeze concentration process (1A) and a freeze-drying process (1B).
Figure 1B:
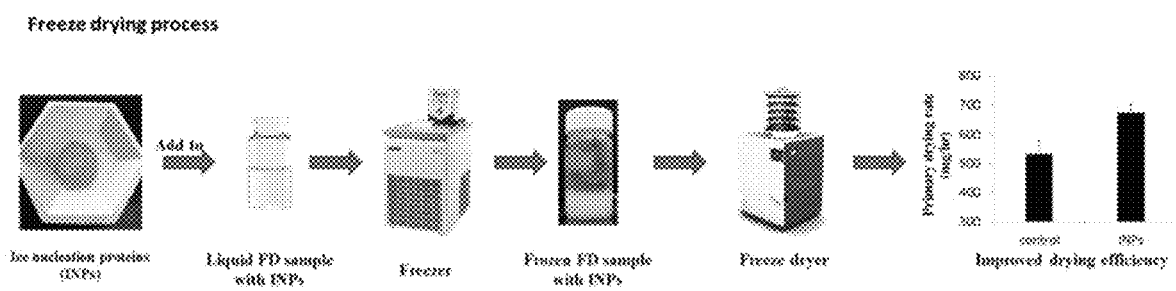

Typically, freeze concentration is a form of melt crystallization where water is partially frozen into an ice crystal slurry, and the solid ice can then be separated from the slurry. The ice and/or the slurry can be subjected to further processing, depending upon the desired outcome. A related process, freeze drying, is a dehydration process by direct sublimation of ice crystals from a frozen product. Because of its low temperature processing condition, freeze drying has been favored by different kinds of liquid and solid foods, such as powdered beverages like coffee and dehydrated snacks like dried vegetables and fruits. The process may also be applied in other industries, such as in the pharmaceutical industry. With the application of freeze drying, these products exhibit advantages of better flavor retention and nutrition preservation, faster rehydration compared to other drying methods, as well as cheaper transportation and longer shelf life. A conventional freeze-drying cycle consists of three steps, including freezing, primary drying, and second drying. Examples of freeze concentration processes and freeze-drying processes can be seen in FIGS. 1A and 1B, respectively.

In various embodiments disclosed herein, water and at least one solute are provided, either separately or previously combined in an aqueous solution. Then, a selected concentration of one or more ice nucleating proteins is added to the aqueous solution, and the combination is partially frozen.

Numerous biogenic INP may be utilized. For example, various embodiment be utilized, but are not limited to, *Pseudomonas syringae* and/or *Erwinia herbicola*.

In one embodiment, *Erwinia herbicola* subsp. *ananas* was obtained from the American Type Culture Collection (ATCC; ATCC Catalog No. 11530; Manassas, Va., USA).

Yeast extract was obtained from BD Biosciences (Franklin Lakes, N.J., USA). Sucrose (>99.9%), sodium chloride, tris(hydroxymethyl)aminomethane, potassium sulfate ($K_2SO_4$), magnesium sulfate ($MgSO_4$), and calcium chloride ($CaCl_2$) were obtained from Fisher Scientific (Fair Lawn, N.J., USA). L-Serine, L-alanine, potassium iodide (KI), and magnesium chloride ($MgCl_2$) were purchased from Sigma-Aldrich (St. Louis, Mo., USA). All reagents were of analytical grade, and deionized water from Milli-Q was used in the embodiment. Seawater was prepared artificially in the laboratory by dissolving 26.73 g of NaCl, 2.26 g of $MgCl_2$, 3.25 g of $MgSO_4$, and 1.15 g of $CaCl_2$ in 1 L of deionized water. (See Sverdrup, H. U. et al, The Oceans: Their Physics, Chemistry, and General Biology; Prentice-Hall: New York, 1942; pp 186.).

*E. herbicola* was then stored frozen at −60° C. and grown in yeast extract (YE) media (20 g/L) containing sucrose (10 g/L), L-serine (2 g/L), L-alanine (2 g/L), $K_2SO_4$ (8.6 g/L), and $MgSO_4$ (4 g/L). Following culture expansion to a density of $10^8$/L, the cells were collected by high-speed centrifugation (10000 g, 20 min at 4° C.), and the resulting pellet was resuspended in 20 mM Tris buffer containing 20 mM $MgCl_2$. The suspension was then sonicated on ice, using three brief (10 s) sonication bursts generated by a Brandson sonicator (Danbury, Conn., USA) set at 4.5 power output. Following sonication, the suspension was centrifuged again as described above, and the supernatant was isolated and ultracentrifuged at 4° C. and 160000 g for 2 h. Finally, the resultant pellet was resuspended in 20 mM Tris buffer with 20 mM $MgCl_2$ and freeze-dried to obtain the INP powder. Lyophilized INPs isolated in this manner were stored at −18° C. prior to use. (See Shi, K. et al, A novel approach for improving yeast viability and baking quality of frozen dough by adding biogenic ice nucleators from Erwinia herbicola. J. Cereal Sci. 2013, 57, 237-243.).

Figure 2A:
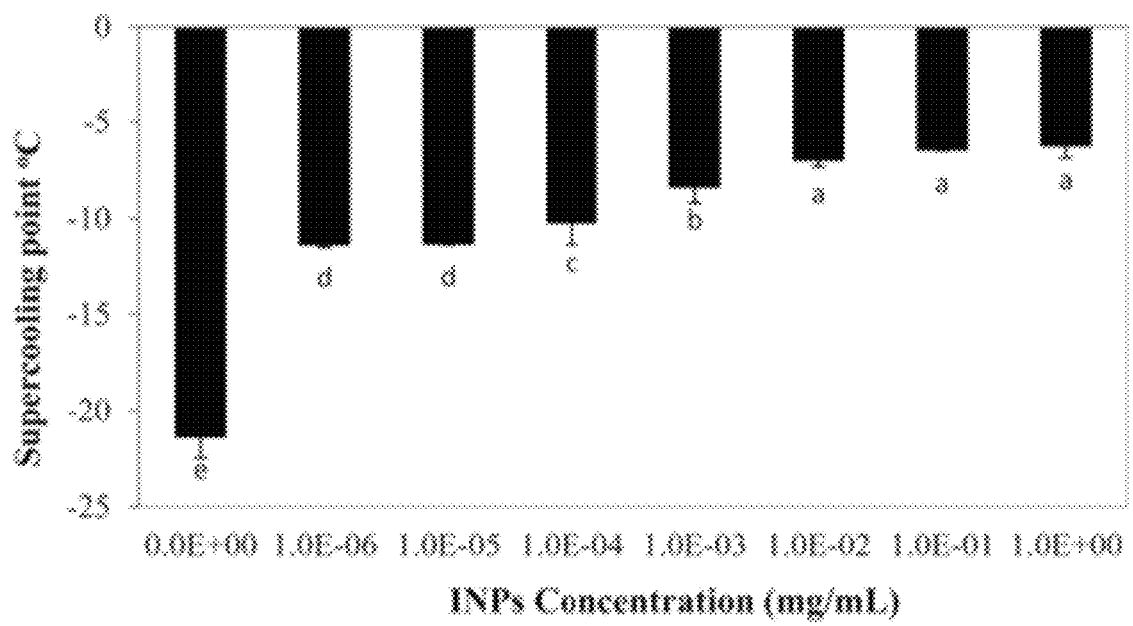
FIG. 2A is a graph indicating the effect of increasing INP concentrations on the supercooling point of seawater. (The letters associated with error bars indicate the result of statistical analysis. Values with no common letter are significantly different ($P<0.05$)).
Figure 2B:
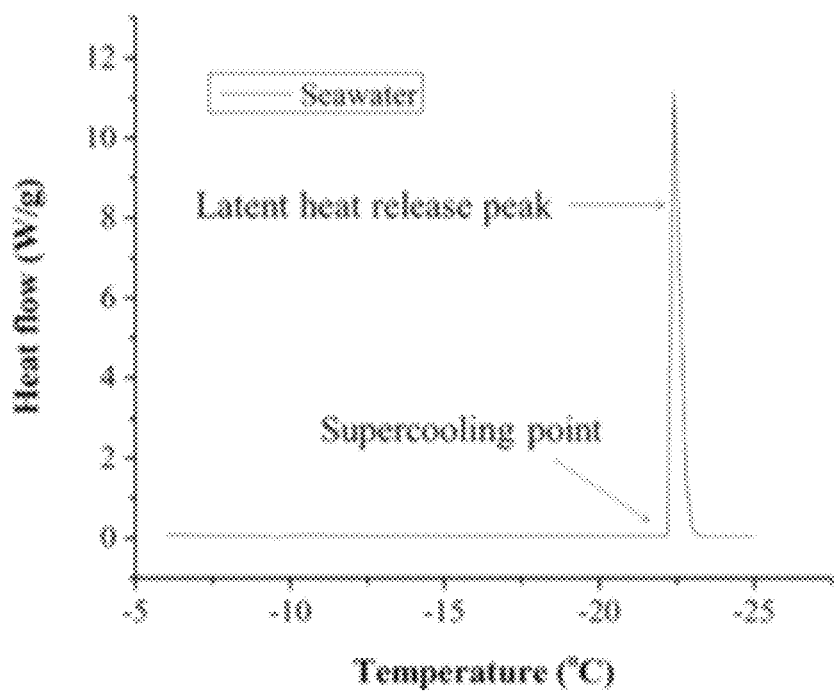
FIG. 2B is a DSC thermogram of freezing of artificial seawater solution at a cooling rate of 1° C./min.

The effect of INPs isolated from E. herbicola on the supercooling point of seawater was investigated using differential scanning calorimetry (FIG. 2A). The supercooling point was determined as the lowest temperature that the supercooled solution could reach before the phase transition from water to ice took place, with the release of latent heat (as indicated in FIG. 2B). The supercooling point of seawater containing different concentrations of INPs was measured by DSC using a DSC 823E thermal analyzer (Mettler-Toledo Inc., Columbus, Ohio, USA) charged with liquid nitrogen and compressed nitrogen gas as described in the manufacturer's instructions. Briefly, 30 μL of the seawater samples was transferred into 40 μL aluminum crucibles with lids and positioned in the unit. The temperature ramp of the DSC unit was set at a freezing rate of 1° C./min, from 4 to −25° C. An empty crucible was used as the reference. The temperature point exhibiting the maximum observed heat flow was recorded as the supercooling point.

With the addition of INPs at a final concentration of 1 mg/mL, the supercooling point of the seawater samples was elevated to −6.24° C., as compared to the supercooling temperature of −21.38° C. for the control samples. Even at the lowest INP concentration of 10-6 mg/mL, the supercooling point increased to −11.36° C. As suggested by Jung et al., the nonlinear relationship between INP concentrations and supercooling point might mainly be due to the dependence of ice nucleation activity on the degree of protein aggregation. (See Jung, H. C. et al, Expression of carboxymethylcellulase on the surface of *Escherichia coli* using Pseudomonas syringae ice nucleation protein. Enzyme Microb. Technol. 1998, 22, 348-354). In the theory of heterogeneous ice nucleation, a larger nucleating site leads to a higher threshold temperature of ice nucleation activity. (See Schmid, D. et al, Molecular organisation of the ice nucleation protein InaV from Pseudomonas syringae. FEBS Lett. 1997, 414, 590-594). Therefore, the variation of ice nucleation activity at the supercooling point (threshold temperature), shown by the DSC measurement, is likely to be the result of protein aggregation into different sizes of ice nuclei. Such an aggregation process was suggested to be limited by stochastic chain-terminating events in the growing ice nucleus rather than the availability of INP concentration range. (See Southworth, M. W. et al, Nonlinear relationship between concentration and activity of a bacterial ice nucleation protein. J. Biol. Chem. 1988, 263, 15211-15216). The results indicate that INPs can function as effective ice nucleators for controlling the supercooling level of seawater even at low concentrations. The elevated nucleation temperature also suggests significant energy savings for the freezing step.

Figure 3:
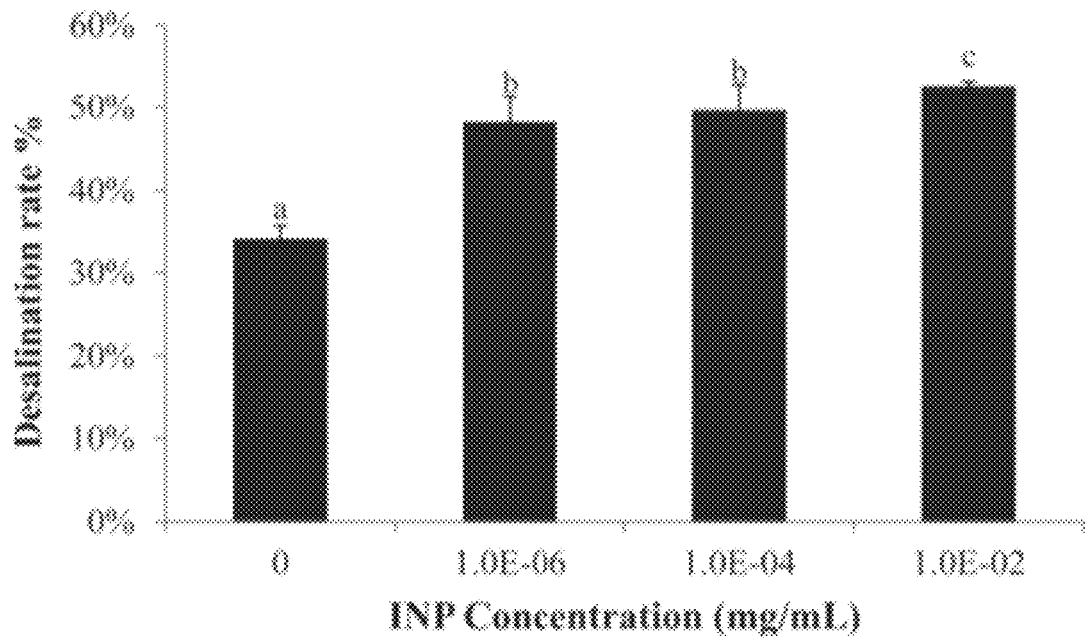
FIG. 3 is a graph indicating the effect of increasing INP concentrations on desalination rate. (Values with no common letter are significantly different ($P<0.05$)).

The effect of INPs on freeze concentration efficiency as a function of desalination rate was investigated at different INP concentrations using block freeze concentration assisted by centrifugation (FIG. 3). In this technique, concentrated solute drains through the porous ice block and is separated from the ice under centrifugal force. The addition of INPs at a concentration of 1e mg/mL increased the desalination rate in one embodiment by 14% as compared to the control sample. This rate continued to increase from 48 to 53% with increases in INP concentrations from $10^{-6}$ to $10^{-2}$ mg/mL. The results demonstrate that INPs can increase desalination rates, indicating that INPs can improve concentration efficiency and thus reduce related energy costs.

The artificial seawater (40 mL) used in one embodiment was frozen in plastic centrifuge tubes (internal diameter of 29 mm) by radial freezing using a static cooling bath containing a mixture of water and ethylene glycol. (See Petzold, G. et al, Centrifugal freeze concentration. Innovative Food Sci. Emerging Technol. 2013, 20, 253-258). The samples were then removed from the cooling bath and rapidly subjected to refrigerated centrifugation to separate the brine from the ice fractions. After centrifugation, the frozen ice fractions were thawed and the total dissolved salt (TDS) was measured at ambient temperature using a conductivity meter (model 09-326-2, Fisher Scientific). The volume of the solutions was also determined. The desalination rate was calculated using the equation $$Rd = \frac{C_o - C_{ice}}{C_o} \times 100\%$$

where $R_d$ is the desalination rate (%), $C_0$ is the TDS of the original seawater, and $C_{ice}$ is the TDS in the melt ice fraction.

To evaluate the effect of INPs on the efficiency of freeze concentration, the freeze concentration procedures above were performed using different variables to determine the desalination rates. The experimental variables tested in these studies were INP concentration, freezing temperature, and centrifugal time and speed. The levels of tested variables and controlled variables during each freeze concentration experiment are listed in FIG. 14. For example, the tested variable of experiment group 1 was INP concentration. The controlled variables of group 1 were freezing temperature at −18° C. and centrifugation condition at 500 rpm for 5 min. The salt concentration of seawater in nature (i.e., 33.3 g/L) was used as the initial salt concentration during the experiments of these four variables (i.e., experiment groups 1-4). For desalination cycles (i.e., experiment groups 5 and 6), both control and INP samples started at the concentration of seawater in nature (i.e., 33.3 g/L). The initial concentration of each subsequent cycle was based on the salt concentration in melted ice of its previous cycle. The desalination cycles ended when the salt concentration in the melted ice fraction was less than the U.S. Environmental Protection Agency (EPA) standard of drinking water (i.e., 0.5 g/L). All tests were performed in triplicates.

Figure 15:
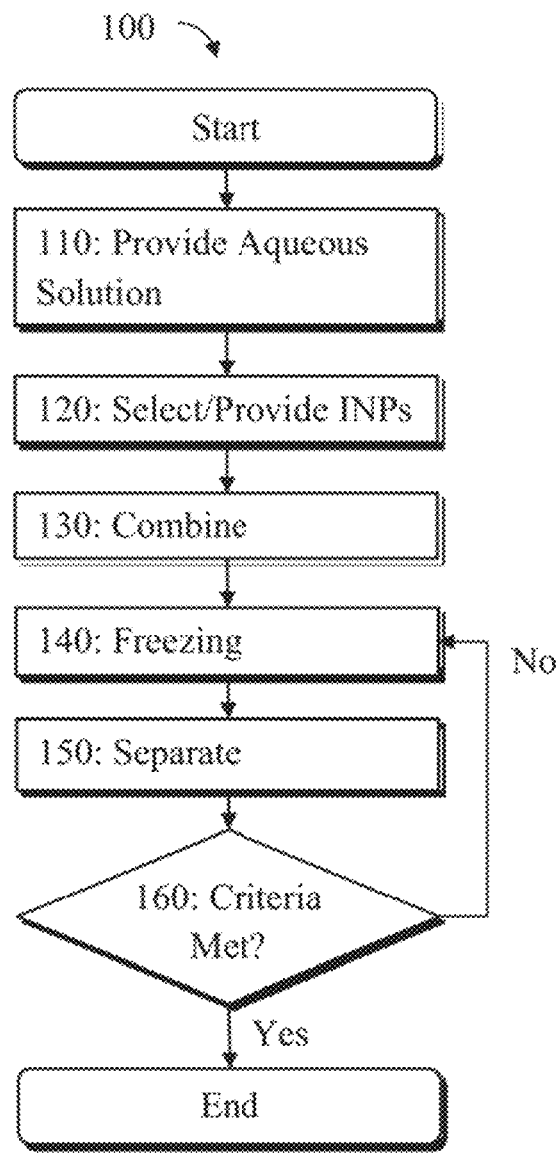
FIG. 15 is a flowchart depicting one embodiment of an n-cycle freeze concentration/desalination method.

Referring to FIG. 15, an embodiment of an n-cycle freeze concentration/desalination method is depicted. The method (100) begins by providing an aqueous solution (110) and then selecting and providing an appropriate concentration of biogenic INPs (120). These are then combined (130), which may involve some additional processing steps such as mixing, etc. The combination is then cooled or partially frozen (140), and ice that is formed is separated from the partially frozen combination (150) in some fashion, such as via centrifugation. Typically, the ice is then melted. At this time, if certain criteria is not met (160), either the melted ice (which typically has a reduced solute concentration) or the remainder of the aqueous solution (which typically has an increased solute concentration) is then sent through at least one additional freezing/separating step. In some cases, the determination as to whether the criteria is met may be an actual analytical test to determine concentrations, although typically, the process is designed such that the number of cycles required to reach a desired outcome is known ahead of time, so the determination as to whether the criteria is met may simply be determining if the number of cycles completed matches the number of cycles the process was designed to have. Further, there may be no explicit "determination" step (160), but rather the process be may be designed to have a finite set of multiple stages running in series, each series correlating to one cycle, with the desired product being the output from the final series.

Figure 4:
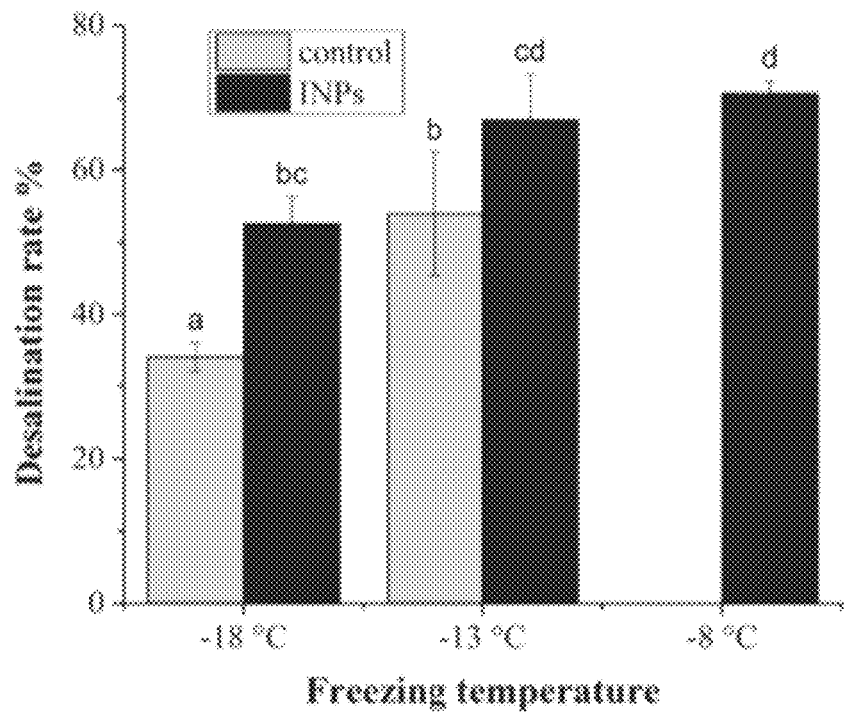
FIG. 4 is a graph indicating the effect of INPs on desalination rate of samples under different freezing temperatures. (Values with no common letter are significantly different ($P<0.05$)).

To examine the practical application of INPs to the production of drinking water from seawater, the effect of these agents on desalination rates at different conditions, including freezing temperature and centrifugation speed or time, were investigated. An INP concentration of $10^{-2}$ mg/mL was utilized in the subsequent experiments. The effect of INPs on desalination rate at different freezing temperatures was determined (FIG. 4). The results show that INPs can improve concentration efficiency at freezing temperatures of −13 and −18° C. compared to the control samples. At a temperature of −8° C., INPs were able to freeze samples while seawater controls remained liquid. This elevation in the freezing temperature induced by INPs is associated with a 36% increase in the desalination rate, which was 2-fold higher than the effect of INPs on the desalination rate of samples frozen at −18° C. This increased desalination rate observed at the higher subzero temperature (−8° C.) is thought to be due to the higher diffusion rate of solute under warmer temperature that then leads to less solute entrapment as compared to samples with INPs at lower freezing temperatures.

Figure 5A:
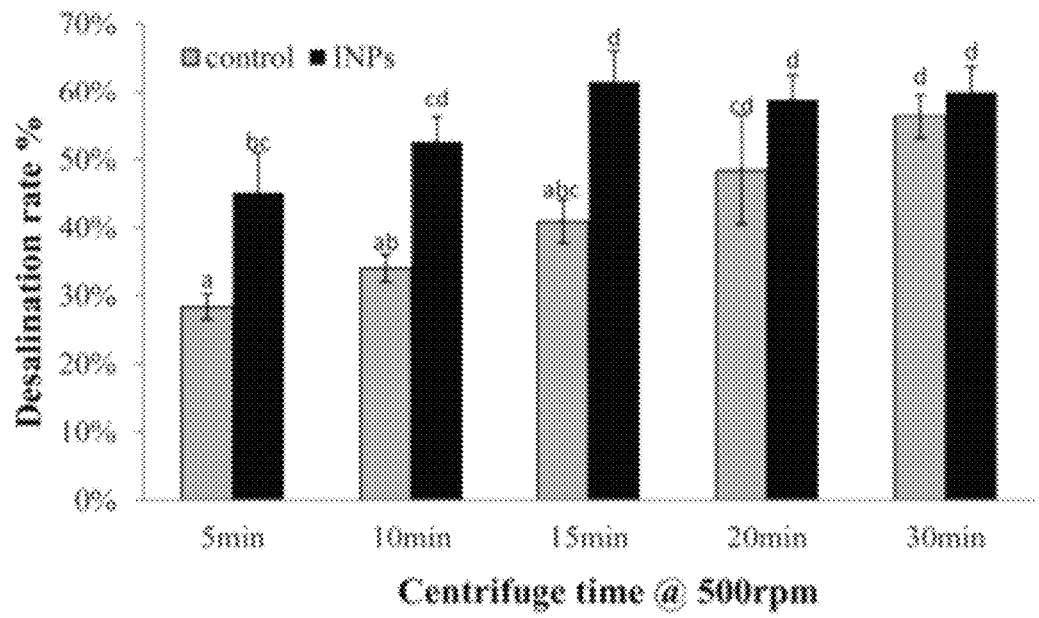
FIG. 5A is a graph indicating the effect of INPs on desalination rate for samples subjected to increasing centrifugation time at 500 rpm. (Values with no common letter are significantly different ($P<0.05$)).
Figure 5B:
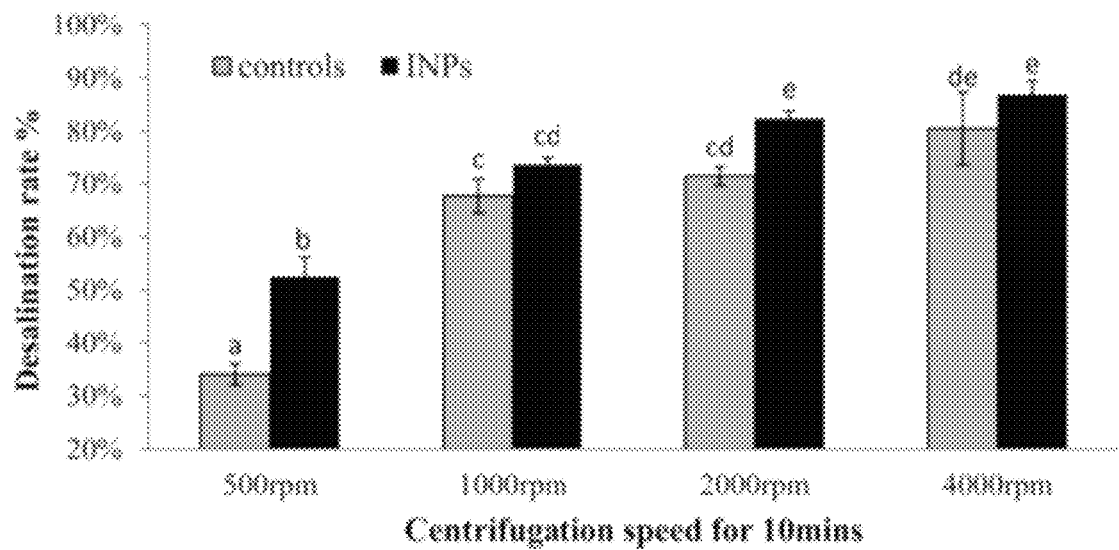
FIG. 5B is a graph indicating the effect of INPs on desalination rate for samples subjected to increasing centrifugation speed for 10 min. (Values with no common letter are significantly different ($P<0.05$)).

The effect of INPs on the desalination rate at different centrifugation conditions was also characterized. Here, desalination rates were determined while centrifugation times were varied (FIG. 5A). In this example, frozen samples of the control seawater and seawater containing INPs were centrifuged at 500 rpm for increasing periods of time (i.e., 5, 10, 15, 20, and 30 min). The results show that INPs exhibit a marked effect on desalination rates at the lower centrifugation times of 5, 10, and 15 min, with increases ranging from 16 to 20% as compared to control samples under the same conditions. (See FIG. 5A) Because there was no significant difference (P<0.05) between the maximum desalination rate for controls at 30 min and the desalination rate achieved by the INP sample at 15 min, the same desalination effect can be achieved by INPs with only half the centrifugal duration. In other studies, the effect of INPs on desalination rates of frozen seawater was investigated by centrifugation for 10 min at increasing speeds (i.e., 500, 1000, 2000, and 4000 rpm). As shown in FIG. 5B, the difference in desalination rates between the control and INP samples was substantial at 18% at 500 rpm but diminished to 6% at a centrifugation speed of 4000 rpm. Because there was no significant difference (P<0.05) between the maximum desalination rate for control samples centrifuged at 4000 rpm and the desalination rate attained by INP samples at 2000 rpm, the same desalination effect can be achieved by INPs with only half the centrifugal speed.

To explore the potential use of INPs for obtaining drinking water in a more energy-efficient desalination process, the effect of INPs on desalination rate of continuous desalination cycles was investigated. Cycles of INP samples were conducted under higher subzero freezing temperatures and lower centrifuge speeds based on results from the studies above. By comparison of the results of desalination cycle 1 from both control and INP samples (shown in FIG. 6), INP samples contained much less residual salt inside the ice phase, even though they were separated at a lower centrifuge speed. At the following desalination cycles, with lower initial salt concentrations, INP samples also had a significantly higher desalination rate as compared to controls. For instance, the third cycle of control samples and the second cycle of INP samples (FIG. 6) had very close residual salt amounts (i.e., 0.9 g/L) in the melted ice fraction, but the initial salt concentration of INP samples (i.e., 3.33 g/L) was much higher than that of control samples (i.e., 1.8 g/L). When the fourth cycle of control samples and the third cycle of INP samples both had initial salt concentrations near 0.9 g/L, the desalination rate of INP samples (i.e., 60%) was significantly higher than that of control samples (i.e., 50%). At the end of cycle 3, INP samples reached the target of containing <0.5 g/L salt in the melt ice, whereas at the end of cycle 3 of control samples, the concentration in melted ice was 0.9 g/L, which was still higher than the EPA standard and thus needed an extra cycle to reach the goal of 0.5 g/L. Therefore, the results above suggest that fewer desalination cycles with less energy cost are needed with the addition of INPs during a continuous desalination process to meet the drinking water standard. This also strongly supports that INPs have the ability to improve efficiency during freeze concentration cycles with different initial solute concentrations.

Energy Savings by INPs To Obtain Drinking Water. The energy savings realized from using INPs in freeze concentration to obtain drinking water are thought to originate from three aspects of the overall process. First, by freezing at a higher subzero temperature with INPs, the thermostats of freezing units could be adjusted to warmer settings.

Previous studies indicate that a freezer consumes less electricity if its thermostat is set to a higher subzero temperature. (See Saidur, R. et al, Role of ambient temperature, door opening, thermostat setting position and their combined effect on refrigerator-freezer energy consumption. Energy Conyers. Manage. 2002, 43, 845-854). The energy savings are due to the decreased frequency of compressor cycles, which decreases the overall running time needed to maintain the desired temperature. Other studies suggest that for each degree of decrease in freezer temperature, energy consumption is increased by 6.5-8%. (See Saidur, R. et al, Factors affecting refrigerator-freezers energy consumption. ASEAN J. Sci. Technol. Dev. 2002, 19, 57-67; Hasanuzzaman, M. et al, Investigation of energy consumption and energy savings of refrigerator-freezer during open and closed-door condition. J. Appl. Sci. 2008, 8, 1822-1831).

Assuming an energy reduction of 6.5% for each degree of increase, the energy cost associated with freezing during each desalination cycle could be reduced by almost 50% by freezing at −8° C. with INPs rather than at −18° C. Second, by centrifugation at lower speeds with INPs, the amount of energy consumed during the separation process would be reduced. The affinity laws of pump indicate that the power requirement (kW) varies by the cube of the change in speed, which means that at 2 times the speed, a centrifuge would consume 8 times the power. On the basis of this projection, the energy cost associated with centrifugal separation for samples containing INPs at 2000 rpm would require only one-eighth of that needed for control samples at 4000 rpm. Moreover, decreasing the centrifugation speeds required for desalination could also greatly reduce the initial installation costs as well as the costs associated with equipment repair and wear. (See Spicer, A. Advances in Preconcentration and Dehydration of Foods; Applied Science Publishers: London, UK, 1974; pp 138-145). Third, these studies on desalination cycles suggests that INP required only three cycles to reach the drinking water standard, whereas control samples needed four cycles. Analysis of estimated energy cost to obtain drinking water through desalination cycles in this study was calculated on the basis of laboratory equipment specifications during freezing and separation steps (FIG. 7). By combining the energy consumption for each step with cycle numbers and final yield, the total energy savings by INPs could be approximately 50% for obtaining fresh drinking water. Therefore, the application of INPs in freeze concentration suggested great potential for energy savings.

To examine the influence of INPs on ice morphology, the pattern of individual ice crystals was first characterized using an optical microscope. The boundaries of ice crystals in the images could be visually defined by the brine veins, or brine channels, that contained concentrated salt solutions. Such structures within ice are known to result from solute accumulation at the solid-liquid interface during the growth of ice crystals. (See Junge, K. et al, A microscopic approach to investigate bacteria under in situ conditions in sea-ice samples. Ann. Glaciol. 2001, 33, 304-310; Junge, K. et al, Bacterial activity at −2 to −20° C. in Arctic wintertime sea ice. Appl. Environ. Microbiol. 2004, 70, 550-557; Petzold, G. et al, Vacuum-assisted freeze concentration of sucrose solutions. J. Food Eng. 2013, 115, 357-361).

Because the ice crystals appeared irregular in shape, Feret's diameter determination was used in this study. The evaluation of ice crystal structure was conducted using a 10× Olympus lens (0.25 N.A.) (Olympus, Tokyo, Japan) and a Q imaging 2560×1920 pixel CCD camera Micropublisher, Surrey, Canada) equipped with a Linkham temperature-controlled imaging stage (LTS120, Linkham, Surrey, UK). In a typical experiment, samples of seawater containing INP concentrations ranging from $10^{-7}$ to $10^{-2}$ mg/mL were frozen in Petri dishes. The frozen preparations were placed on the microscope stage setting at −18° C., and digital images of the ice crystal structure were collected by focusing on the surface ice layer. The average size of the ice crystals was determined with ImageJ software (version 1.46r, NIH, Bethesda, Md., USA), using Feret's diameter calculation. (See Wang, S. Y. et al, Ice-structuring peptides derived from bovine collagen. J. Agric. Food Chem. 2009, 57, 5501-5509; Wang, S. et al, Optimisation of hydrolysis conditions and fractionation of peptide cryoprotectants from gelatin hydrolysate. Food Chem. 2009, 115, 620-630).

Figure 8:
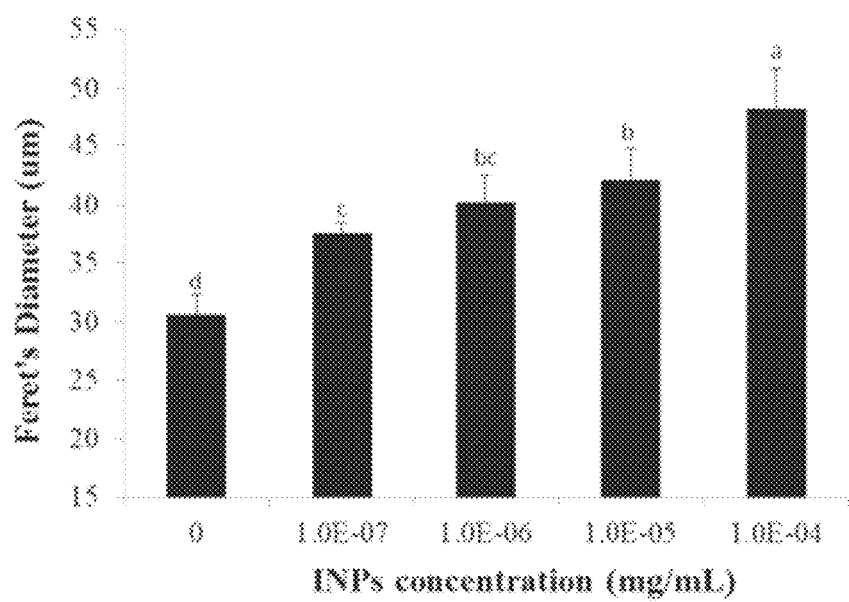
FIG. 8 is a graph indicating the quantitative determination of ice crystal size in frozen seawater at various INP concentrations. (Values with no common letter are significantly different ($P<0.05$)).

An object's size was measured along a specific direction, instead of assuming crystal cross sections are normalized circles with defined dimensions. Using this method of analysis, the size of ice crystals in the visual field was found to increase significantly with increasing concentrations of INPs (FIG. 8). It must be noted that the size of crystals formed in the presence of higher concentrations of INPs tested ($>10^{-3}$ mg/mL) was not calculated because most crystals that appeared in the field were not intact. However, increases in crystal size in these samples were obvious with the increase of INP concentration. With the addition of INPs at the concentration of $10^{-7}$ mg/mL, the average size of ice crystals significantly increased to 37.6 μm as compared to control samples at 30 μm. Between INP concentrations from le to $10^5$ mg/mL, the increase of ice crystal size was relatively small, with only a 2 μm increase between every concentration increase.

At the concentration of $10^{-4}$ mg/mL, the average size of ice crystals was 48.1 μm, which is a significant increase from the size of 42.1 at $19^{-5}$ mg/mL. Although INP concentrations $>10^{-3}$ mg/mL were not measured quantitatively, the increase of ice crystal size was obviously significant, suggesting that ice crystal size increased more significantly at higher INP concentrations between $10^{-4}$ and $10^{-2}$ mg/mL. It has been recognized that for freeze concentration processes, larger ice crystals are desired as they improve concentration efficiency by minimizing the surface area at the interface and thus reduce the solute entrapped within the ice. (See Petzold, G. et al, Ice morphology: fundamentals and technological applications in foods. Food Biophys. 2009, 4, 378-396; Spicer (1974)). Studies have been conducted by other investigators to generate larger ice crystals through other methods, such as modifying the operation conditions or the equipment used for crystallization process, and have demonstrated optimized separation process with improved concentration efficiency. (See Kobayashi, A. et al, A method for making large agglomerated ice crystals for freeze concentration. J. Food Eng. 1996, 27, 1-15; Smith, C. E. et al, Ice crystal size changes during ripening in freeze concentration. Biotechnol. Prog. 1985, 1, 111-120). Therefore, it is very likely that the formation of larger ice crystals by INPs helped improve concentration efficiency.

However, such ice morphology of the thin layer observed under microscope is limited to a small and two-dimensional scale, which is inadequate to represent the actual morphology of the frozen matrix subjected to the freeze concentration process. The evaluation of INP effect on three-dimensional morphology of ice blocks within different growth heights was conducted using X-ray CT to scan both control and INP samples (i.e., $10^{-2}$ mg/mL) frozen on a cold surface.

Three-dimensional imaging analysis of frozen and centrifuged seawater samples was obtained using the Albira PET/CT Imaging System (Bruker, Billerica, Mass., USA) at standard voltage and current settings (i.e., 45 kV and 400 μA) at the Molecular Imaging Center at Rutgers University. A set of 400 image projections was then captured throughout a 360° rotation of the sample. Reconstruction of X-ray data produced 3D images in which the air, ice, and brine pockets could be differentiated on the basis of differences in X-ray attenuation properties.

The morphology of ice structures within different growth heights was studied to determine interface evolution in both control and INP samples. The samples were frozen on a cold surface at −18° C. until the vertical length of frozen matrix reached a targeted growth height. The frozen samples were then removed from the cold surface to pour out the remaining liquid and kept in the freezer at −18° C. before imaging analysis. A KI contrast agent was included in the solutions prior to freezing the samples for better differentiation between ice and brine phases. The morphology of ice crystals in both horizontal and vertical directions was characterized by the measurement of crystal dimension and brine inclusion width. The hydraulic diameter in the cross sections at different growth heights of the entire frozen sample was calculated on the basis of flow mechanic theory to compare the brine flow rate in control and INP samples. (See Yamaguchi, H., Engineering fluid mechanics. Fluid Mechanics and Its Applications; Springer: Dordrecht, The Netherlands, 2008; Vol. 85, pp 319-339; Nguyen, N.-T. et al, Fluid mechanics theory. Fundamentals and Applications of Microfluidics, 2nd ed.; Artech House Microelectro-mechinical Systems Series; Artech House: Norwood, Mass., USA, 2002; pp 37-38).

The hydraulic diameter with different INP concentrations was determined at the same growth height. The hydraulic diameter of different channel shapes is given by $$D_h = \frac{4 \times \text{cross-section area}}{\text{wetted primeter}} = \frac{4A}{P}$$

For rectangular cross section:

$$D_h = \frac{4ab}{2(a+b)} = \frac{2ab}{a+b} \tag{1}$$

For triangular cross section:

$$D_h = \frac{4 \times \frac{b}{2}\left(a^2 - \frac{b^2}{4}\right)^{1/2}}{2a+b} \tag{2}$$

$D_h$=hydraulic diameter, a=ice crystal dimension in the cross section, and b=maximum width of brine inclusion between two ice crystals.

Frozen samples for the brine distribution study were prepared in centrifugal tubes as previously described in the centrifugal freeze concentration procedures and placed in a cooling bath at the subzero temperature of −18° C. until completely frozen. Segmentation for imaging processing is done using thresholding techniques where the volume is partitioned into voxel groups of each region of interest (ROI) inside the sample. Volumes of the brine inside frozen samples were determined using VivoQuant image analysis software (version 1.23, inviCRO LLC, Boston Mass., USA). In a typical study, volumes of the entrapped brine liquid were resolved and determined using a threshold range of 80-150 Hounsfield units. (See Obbard, R. W. et al, Imaging brine and air inclusions in sea ice using micro-X-ray computed tomography. J. Glaciol. 2009, 55, 1113-1115; Golden, K. M. et al, Thermal evolution of permeability and microstructure in sea ice. Geophys. Res. Lett. 2007, 34, L16501).

Figure 9:
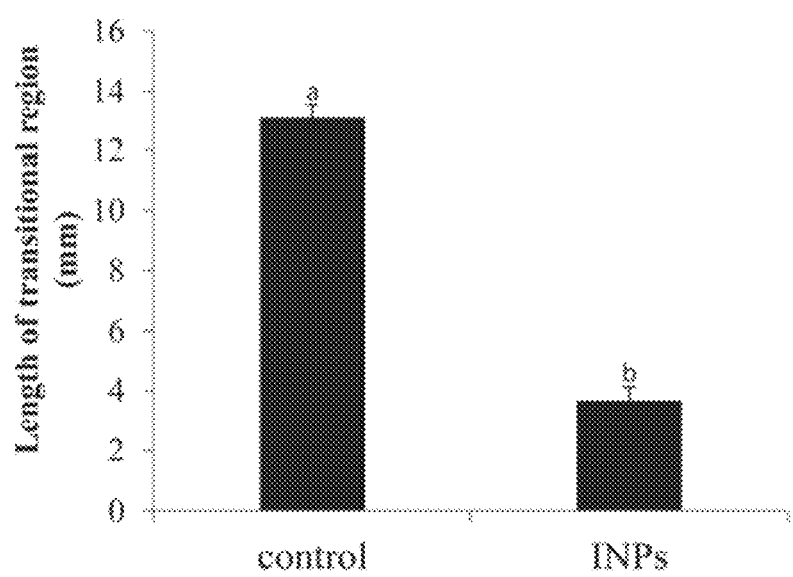
FIG. 9 is a graph indicating the effect of INPs on the length of the transitional region before turning into lamellar structure.

Radiographs show that the periphery of the ice block (initial ice layer close to the cold surface) is composed of a zone in which solute and randomly oriented ice crystals were finely commingled. The thickness of this peripheral layer, described as a "transitional region" by other investigators (see Delattre, B. et al, Unidirectional freezing of ceramic suspensions: in situ X-ray investigation of the effects of additives. ACS Appl. Mater. Interfaces 2014, 6, 159-166), was significantly decreased in samples containing INPs. The average length of the transitional region for control and INP samples in this study was measured to be 13.0 and 3.6 mm, respectively, for a total crystal growth length of 20 mm (FIG. 9). The lamellar structure of ice crystals emanating from this region extended in the direction of crystal growth. Because this region is homogeneous across all of the vertical slices of the samples, the fraction of lamellar ice structure can be calculated on the basis of their length along the freezing direction. Therefore, in the current study, within an ice crystal growth length of 20 mm, the lamellar ice structure consists of roughly 35% of the volume in control samples compared to 82% of INP samples. Such parallel ice structures are suggested to occlude less solute and work as drainage channels toward the freezing front. (See Waschkies, T. et al, Investigation of structure formation during freeze-casting from very slow to very fast solidification velocities. Acta Mater. 2011, 59, 5135-5145). This difference in ice matrix morphology made by INPs might also have a significant impact on other freeze concentration processes, such as progressive freeze concentration. The thickness of the ice layer grown on the cold surface in recent progressive freeze concentration studies is approximately 5-15 mm, which is within the range of crystal growth length (20 mm) in this study. (See Miyawaki, O. et al, Tubular ice system for scale-up of progressive freeze-concentration. J. Food Eng. 2005, 69, 107-113; Sanchez, J. et al, Progressive freeze concentration of orange juice in a pilot plant falling film. Innovative Food Sci. Emerging Technol. 2010, 11, 644-651). In certain embodiments, the lamellar ice crystal has an inclusion width that is less than 10% of the crystal dimension, and preferably less than 7% of the crystal dimension. In other embodiments, the lamellar ice crystal structure has a hydraulic diameter that is at least 1.5 times the inclusion width, and preferably at least 1.8 times the inclusion width.

Therefore, these results are likely to also be applicable to other freeze concentration processes that involve growing ice crystals on cold surfaces.

Figure 10:
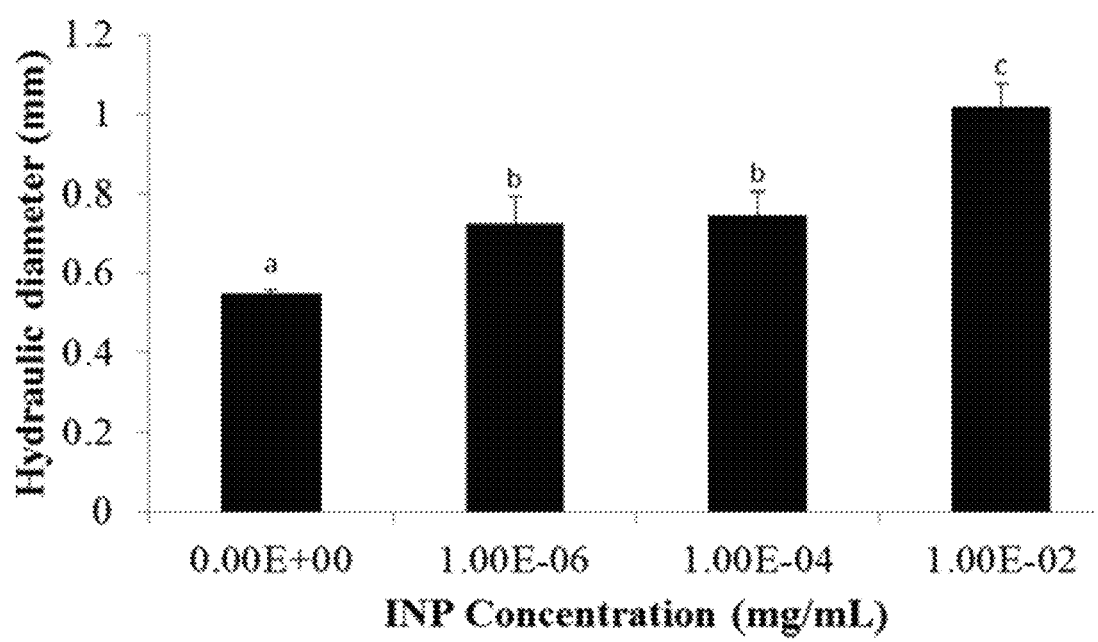
FIG. 10 is a graph indicating the effect of INP concentration on hydraulic diameter. (Values with no common letter are significantly different ($P<0.05$)).

Besides the longitudinal growth direction, the morphology of longer ice crystal dimension and parallel ice plate was also observed in the cross sections of INP samples (i.e., $10^{-2}$ mg/mL). With the measurement of crystal dimension and brine inclusion width, the hydraulic diameter was calculated at different growth heights of the frozen sample to indicate the brine flow rate in both control and INP samples. The cross section of INP samples contains parallel ice plates so that the brine flow inside goes through rectangularly shaped pores, whereas in control samples the pores are closer to triangularly shaped. On the basis of equations 1 and 2, the hydraulic diameters in control and INP samples are shown in FIG. 11. The INP samples with rectangularly shaped pores have a significantly larger hydraulic diameter at different heights through the entire frozen sample as compared to controls. Because the flow rate is proportional to the hydraulic diameter, it is mechanically easier for the liquid inside INP samples to be expelled. (See Nguyen, N.-T.; Wereley, S. T. Fluid mechanics theory. Fundamentals and Applications of Microfluidics, 2nd ed.; Artech House Microelectromechinical Systems Series; Artech House: Norwood, Mass., USA, 2002; pp 37-38). The ice morphology in cross sections changes at different INP concentrations. Further measurement of these radiographs suggests that ice crystal dimension increases with the increase of INP concentration. The solute inclusion width between ice crystals also changes at different INP concentrations (as shown in FIG. 12). On the basis of equations 1 and 2, the hydraulic diameter is calculated using the results of crystal dimension and inclusion width, suggesting an increase of hydraulic diameter with the increase of INP concentration (FIG. 12 and FIG. 10). Thus, the concentrated solutes can be more easily drained through these larger hydraulic pores along the longitudinal channels in INP samples when compared to the crystal morphology in control samples of this study.

Therefore, the increased concentration efficiency in INP samples is very likely to be closely related to those ice morphology alterations.

Because the solute distribution in frozen sample is dominated by ice morphology, X-ray CT was also used to observe the brine distribution in both control and INP samples, to shed more light on the mechanism of efficiency improvement.

For this analysis, a range of pixel intensities reflecting the radiographic density of brine pockets was assigned a false color (i.e., yellow) and analyzed. Using this method the distribution of the brine pockets inside the ice matrix, as well as the volumes of the entrapped concentrated salt solution, could be determined directly. Comparison of the images shows that samples containing INPs exhibited the colored brine pockets mainly close to the center of the frozen matrix, whereas in control samples these pockets were distributed throughout the sample from center to edge. Because radial freezing was utilized to generate these samples, this observation indicates an improved exclusion of brine liquid at the ice-brine interface during the freezing process in the INP samples.

Figure 13:
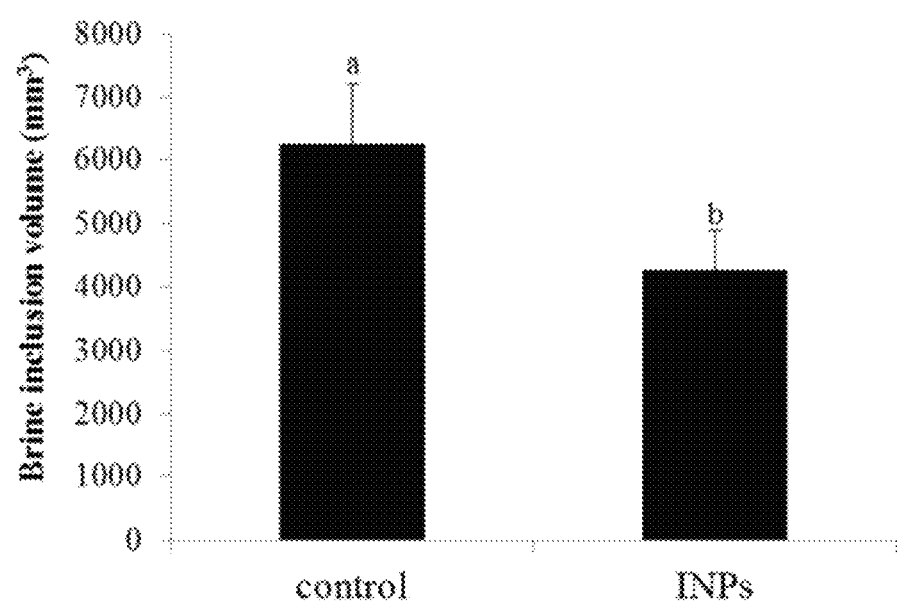
FIG. 13 is a graph illustrating the results of a quantitative analysis of brine inclusion volume highlighted in the CT images of controls and INP samples. (Values with no common letter are significantly different ($P<0.05$)).

Quantitative volumetric analysis of the false-colored brine pockets within the three-dimensional images confirmed that less brine was entrapped inside the ice matrix of INP- containing samples (FIG. 13), which might contribute to improvement of efficiency.

Moreover, upon examination of the radiographs of centrifuged INP sample after brine removal, the lamellar structure on the interfacial surface can also be observed. This confirms the formation of liquid channels in INP samples during the freezing step in this study. Conversely, after centrifugation, control samples exhibited a tortuous crystal morphology at the interfacial surface, suggesting a non-oriented crystal and solute mixture during the freezing process.

This method of using INPs can significantly improve the efficiency of block freeze concentration with altered ice morphology. The results indicate that approximately 50% of the energy cost associated with freeze concentration can be saved by the inclusion of INPs in desalination cycles to obtain fresh water. The imaging analysis indicates that INPs can alter ice morphology by inducing the growth of larger sized ice crystals and a lamellar structured ice matrix with a larger hydraulic diameter that facilitates brine drainage and contains less entrapped solute as compared to control samples. INPs can also improve the desalination process as well as other freeze concentration related processes with enhanced efficiency and reduced cost. Furthermore, the use of X-ray CT analysis in this study indicates its applicability to study internal structures of frozen food matrices.

The practical application of INPs to the freeze-drying process provides similar results. For these tests, *Erwinia herbicola* was stored frozen at −60° C. and grown in yeast extract (YE) media (20 g/L), containing sucrose (10 g/L), L-serine (2 g/L), L-alanine (2 g/L), $K_2SO_4$ (8.6 g/L) and $MgSO_4$ (4 g/L). Following culture expansion to a density of $10^8$/L, the cells were collected at 4° C. and 9000 rpm for 20 mins by Beckman Coulter Avanti J-E Centrifuge (Brea, Calif.), and the resulting pellet was re-suspended in 20 mM Tris buffer containing 20 mM $MgCl_2$. The suspension was then sonicated on ice, using three brief (10 s) sonication bursts generated by a Brandson sonicator (Danbury, Conn.) set at the 4.5 power output setting. Following sonication, the suspension was centrifuged again as described above and the supernatant was isolated and ultra-centrifuged at 4° C. and 47,500 rpm for 2 h using Beckman L8-70 Ultracentrifuge (Brea, Calif.). Finally, the resultant pellet was re-suspended in 20 mM Tris buffer with 20 mM $MgCl_2$, and freeze-dried to obtain the INP powder. Lyophilized INPs isolated in this manner were stored at −18° C. prior to use.

For determining the primary drying rate, a 10% sucrose solution was prepared as the model of liquid food for this freeze drying example. 5 mL volume of sucrose solutions were added into each bottle and INPs were added at concentrations of $10^{-6}$, $10^{-4}$ and $10^{-2}$ mg/mL. All solutions were subjected to directional freezing by exposing the bottom surface of the samples to the freezing bath set at constant temperatures of −8 or −13 or −18° C. until complete frozen. For food systems, 5% bovine serum albumin, coffee and milk were prepared as the systems with typical food biopolymers and INPs were added at concentrations of $10^{-2}$ mg/mL. Solutions of each food systems were subjected to directional freezing under constant temperatures of −8 or −18° C. until complete frozen. Then all the frozen samples prepared above were transferred into the chamber of VirTis Freezemobile R5L Freeze Dryer (Stone Ridge, N.Y.) for the drying process. Primary drying rate was determined as the average weight loss rate during the time interval when 20-50% of the crystalized water had sublimed. In this study, the time interval is 3 hs when almost 40% ice had sublimed.

Figure 16A:
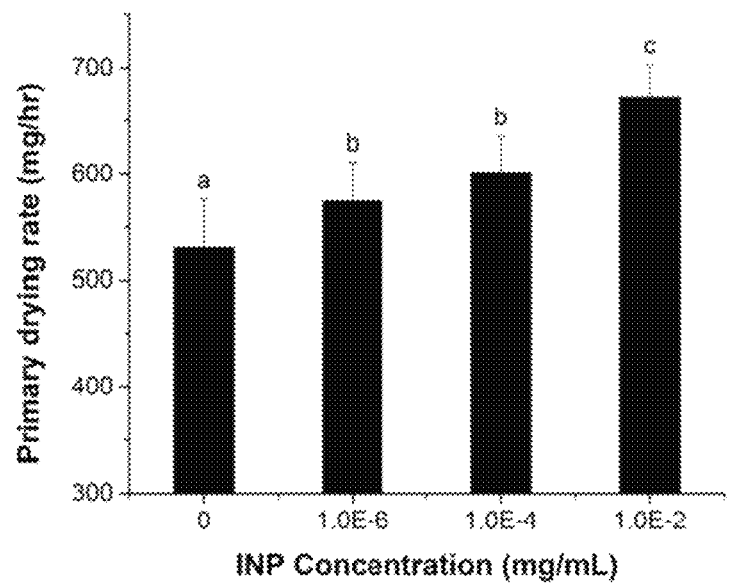
FIG. 16A is a graph illustrating the effect of INP concentration on primary drying rate of sucrose solutions. (Values with no common letter are significantly different ($P<0.05$)).

For determining total drying time, a 5 mL volume of 10% sucrose solutions were added into each bottle and INPs were added at the concentration of $10^{-2}$ mg/mL. All the solutions were incubated in the cooling bath set at the subzero temperature of −18° C. or −8° C. under unidirectional freezing from bottom to top until the solutions were completely frozen. Then the frozen samples were transferred into the freeze dryer chamber for the drying process. The moisture content of frozen samples was measured at different drying time intervals to determine end point of the drying process. The total drying time was determined when the weight loss of the dried products reached 90%. The process efficiency was determined by measuring the primary drying rate, since the primary drying step is typically the most time consuming stage of the freeze-drying and thus the time consumed at this stage is closely related to process economics (See Parker et al., 2010). The effect of INPs on primary drying rate of 10% sucrose solutions was investigated at different INP concentrations. See FIG. 16A. With the addition of INPs to sucrose solutions at final concentration of $10^{-6}$, $10^{-4}$ and $10^{-2}$ mg/mL, the primary drying rate was elevated respectively by 3.5%, 8.3% and 21.0%, as compared to the control samples. The increase of primary drying rate at INP concentration of $10^{-2}$ mg/mL was more significant than the increase at lower INP concentrations. The results demonstrate that INPs can increase the primary drying rate, indicating that INPs can improve freeze drying efficiency and lead to related energy cost reduction.

Figure 16B:
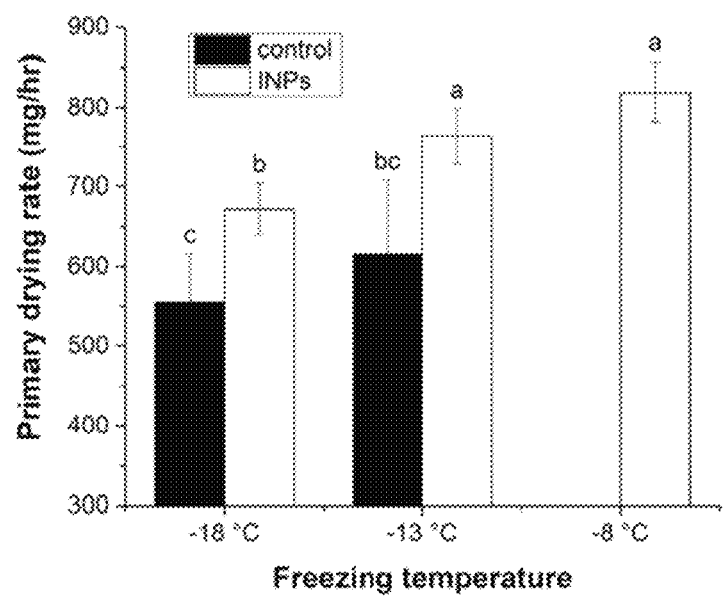
FIG. 16B is a graph illustrating the effect of INPs ($10^{-2}$ mg/mL) on primary drying rate at different subzero freezing temperatures. (Values with no common letter are significantly different ($P<0.05$)).

The effect of INPs on primary drying rate at different freezing temperatures was also determined. See FIG. 16B. The results show that the improvement of primary drying rate by INPs was more significant at higher subzero freezing temperatures (i.e., −13° C. and −8° C.). At −13° C., the primary drying rate of INP samples was 24% higher than control samples frozen under the same temperature. At −8° C., the primary drying rate of INP samples was further increased when the control samples were unable to freeze. The increase of primary drying rate by INPs at −8° C. was 47% higher than control samples frozen at −18° C., which was 2-fold higher than the drying rate of INPs samples frozen at −18° C. Such elevated primary drying rate at −8° C. b$_y$ INPs suggests great energy savings of the drying step and also indicates energy savings of the freezing step by freezing samples at much higher subzero temperature. These results suggest that INPs can effectively improve the primary drying rate at different freezing temperatures and the improvement is more significant at higher subzero freezing temperature, which can further lead to energy savings of both freezing and drying steps.

Figure 17:
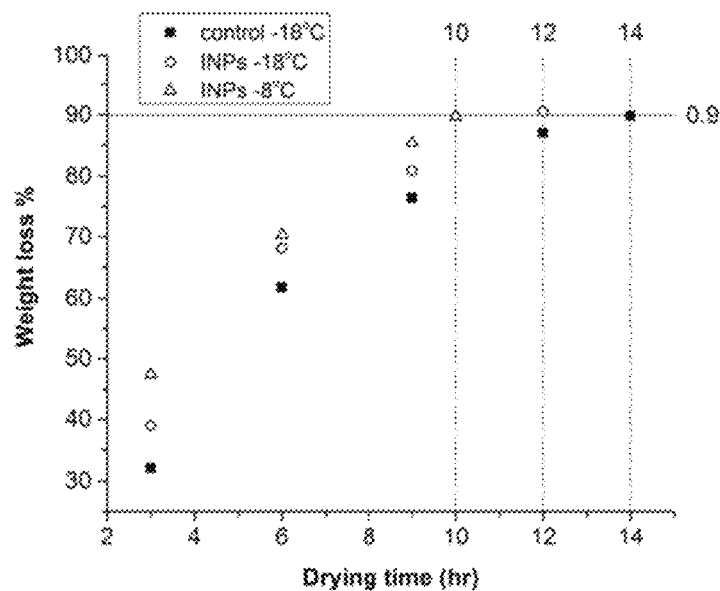
FIG. 17 is a graph illustrating the effect of INPs on total drying time at different subzero freezing temperatures.

To further indicate the potential reduction of process cost by INPs, the effect of INPs on total drying time at different freezing temperatures was measured. As shown in FIG. 17, the total drying time needed for 90% weight loss of frozen samples under different conditions was showed by red solid line. At −18° C., INP samples had larger weight loss at each time point than control samples frozen under the same temperature. INP samples frozen at −8° C. had larger weight loss at each time point than INP samples frozen at −18° C. To reach the weight loss of 90%, control samples require 14 h when it's only 12 h for INP samples under same temperature and 10 h for INP samples frozen at −8° C. Thus, based on the decrease of required drying time, the potential energy saving of drying step is 14.3% with INPs at −18° C. and 28.6% with INPs at −8° C. Further, by freezing samples at higher subzero temperature of −8° C. when control samples remained unfrozen, the energy cost related to refrigerator units can also be reduced because of decreased frequency of compressor cycle and reduced overall running time (Saidur, Masjuki, & Choudhury, 2002). Based on the energy reduction of 6.5% for every one degree increase in freezer temperature setting, the energy cost associated with freezing step could be decreased by almost 50% when freezing at −8° C. with INPs instead of −18° C. (Hasanuzzaman, Saidur, & Masjuki, 2008; Saidur, Masjuki, Mahlia, & Nasrudin, 2002). The total energy savings by adding INPs in at least one example was approximately 28.5%. Therefore, the application of INPs in freeze drying process suggests significant potential of energy savings.

Figure 18:
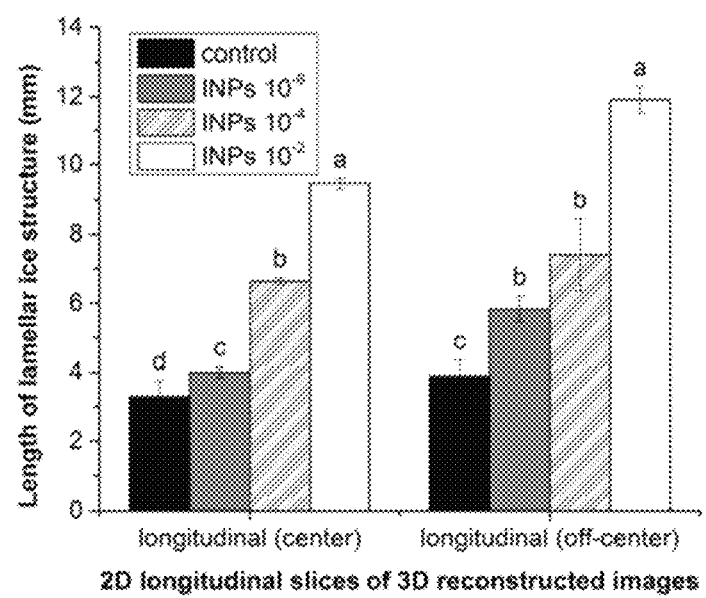
FIG. 18 is a graph illustrating the effect of INP concentration on the length of lamellar spacing in the 2D longitudinal slices of 3D reconstructed images. (Values with no common letter are significantly different ($P<0.05$)).
Figure 19A:
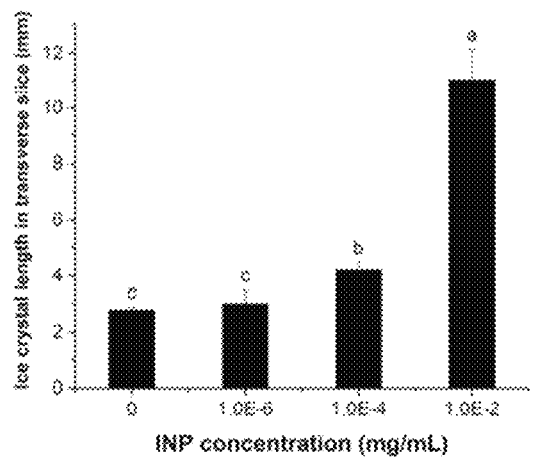
FIG. 19A is a graph illustrating the effect of INP concentration on crystal length in transverse slice. (Values with no common letter are significantly different ($P<0.05$)).
Figure 19B:
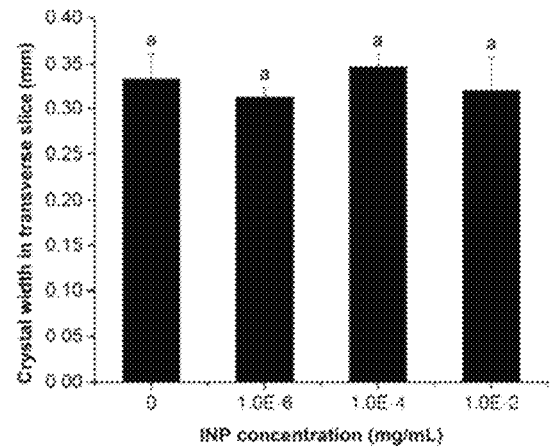
FIG. 19B is a graph illustrating the effect of INP concentration on crystal width in transverse slice. (Values with no common letter are significantly different ($P<0.05$)).
Figure 19C:
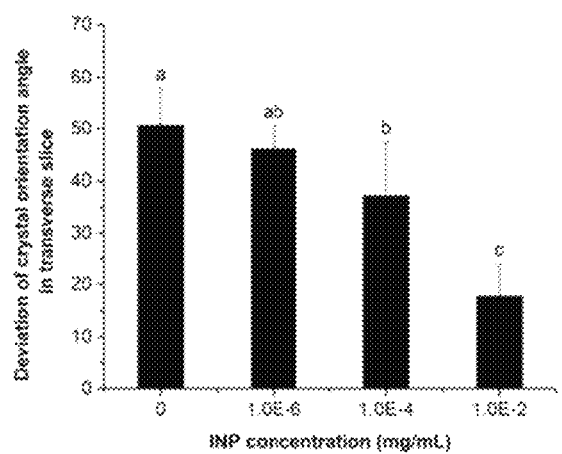
FIG. 19C is a graph illustrating the effect of INP concentration on crystal alignment in transverse slice. (Values with no common letter are significantly different ($P<0.05$)).

The effect of INPs on ice morphology of frozen samples before sublimation step was characterized and measured by X-ray computed tomography. As seen in radiographs, INPs markedly affect ice crystal morphology in different radiographic slices. Images of the ice morphology captured at the center of the longitudinal axis show a distribution of randomly oriented granular ice crystals at the bottom of the frozen matrices, which changed to aligned columnar ice crystals at the top. At lower INP concentrations, the transition from randomly oriented ice crystals to vertically elongated lamellar ice structure occurs at earlier stage of ice growth as compared to the control. This is indicated by the longer length of lamellar spacing in FIG. 18. At the highest INP concentration used in this example (i.e. $10^{-2}$ mg/mL), such transition occurs at the initiation of ice growth very close to the bottom edge, which is positively related to the significant increase of primary drying rate under the same INP concentration. Alternative off-center longitudinal image of each sample shows the same lamellar ice structure pattern at the off-center location, which indicates consistent formation of lamellar ice structure across the entire frozen sample along the longitudinal axis. CT images of the transverse sections of frozen samples show that INPs could induce the formation of columnar ice crystals with longer crystal length (FIG. 19A). Since there is almost no significant difference in crystal width between these samples (FIG. 19B), the increased crystal length by INPs suggests larger crystal size at the cross section, which indicates increased pore size in the dried sample layers. As shown in FIG. 19C, the crystal orientation in the transverse sections has also been influenced by the increase of INP concentration, based on the standard deviation of crystal orientation angle in the images. If the crystals are more paralleled to each other, the deviation of orientation angle between each crystal should be smaller. In FIG. 19C, the deviation of crystal orientation angle decreases with the increase of INP concentrations, which indicates more aligned ice structure by INPs. At the highest INP concentration (i.e. $10^{-2}$ mg/mL) with the smallest deviation, ice crystals become mostly aligned in the transverse sections as compared to the crystals in other samples. Thus, a dual structure of lamellar ice crystals in both vertical and horizontal dimensions has been developed by INPs under the freezing conditions in this study.

Figure 20:
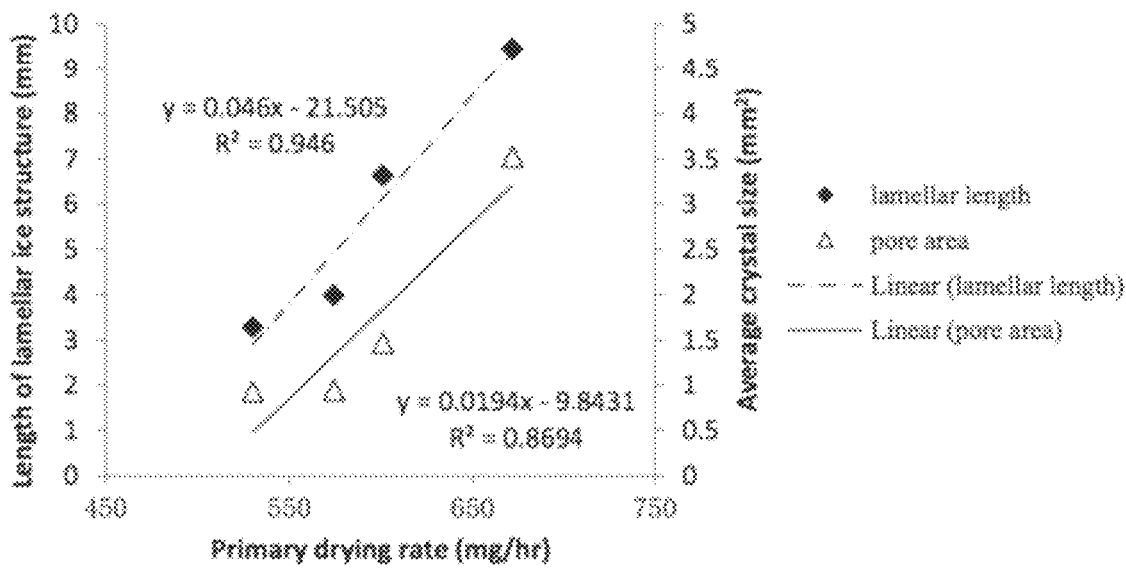
FIG. 20 is a graph illustrating Linear relationship of primary drying rate with the length of lamellar ice structure and average crystal size from X-ray CT results at different INP concentrations.
Figure 21:
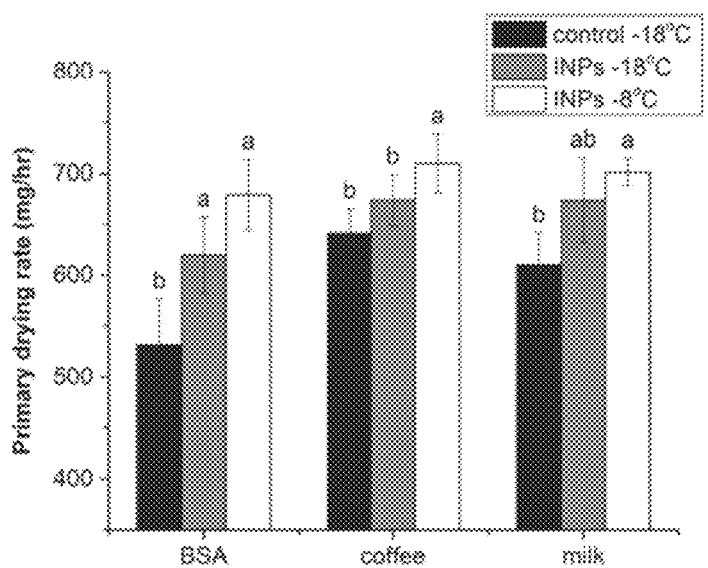
FIG. 21 is a graph illustrating the effect of INPs on the primary drying rate in different food systems at different freezing temperatures. (Values with no common letter are significantly different ($P<0.05$)).

The relationship between ice morphology and freeze-drying efficiency is further indicated in FIG. 20. The results demonstrate that the average crystal size at the cross section and the length of lamellar structure along the growth direction both show linear relationships with primary drying rate. This suggests that these ice morphology characteristics are positively related to the increase of primary drying rate. Previous studies have suggested that during the drying step, samples containing larger ice crystals had less resistance to water vapor flow, since larger pores were left behind (e.g., Geidobler & Winter, 2013). Based on this, the larger sized columnar ice crystals induced by INPs in the cross sections are very likely to facilitate the water vapor flow and thus improve the drying efficiency. In addition, the presence of lamellar ice structure along the growth direction, which is same as the mass transfer direction, might also lead to faster drying rates because of higher void connectivity in the dried cakes. It was suggested that higher void connectivity in the dried matrix, which contains more direct vapor flow paths toward the top, can facilitate the heat and mass transfer and thus reduce the drying time with higher primary drying rate (Searles et al., 2001). Without monitoring ice nucleation, control samples tend to initiate freezing at higher supercooling stage, which leads to the formation of small and randomly oriented ice crystals with a high tortuosity structure that is more difficult for mass and heat transfer (Petzold & Aguilera, 2009). In INP samples, the lamellar ice structure toward the top of frozen samples can leave large pores with high connectivity after drying, which makes mass and heat transfer much easier as compared to the disconnected smaller pores in control samples (Patapoff & Overcashier, 2002; Rezanezhad et al., 2009). Therefore, the increased length of lamellar ice structure along mass transfer direction in INP samples is very likely to be another crucial reason for the drying efficiency improvement.

Previous studies have indicated several mechanisms for the development of lamellar ice structures. First, lamellar ice structure can be developed by the strong growth anisotropy of ice crystals under certain temperature conditions. Similar structure has been observed during the studies of freeze drying and freeze texturization, which were investigating the relationship between nucleation temperature and crystal structures (Nakagawa et al., 2006; Pawelec, Husmann, Best, & Cameron, 2014). In the freeze-drying study of mannitol solution, the anisotropic lamellar ice structure was developed along the temperature gradient of the liquid slurry, and the control of local nucleation temperature was recognized as the key factor to predict the growth of anisotropic ice crystals (Nakagawa et al., 2006). The aligned columnar crystals observed in the sea ice is another example of anisotropic crystal structure grown under natural environment, where the ice crystal morphology changes from randomly to uniformly oriented with horizontal c-axes (Bleil & Thiede, 2012). One of the mechanisms associated with such development of aligned columnar crystals of sea ice is the occurrence of thermal gradients (Stander & Michel, 1989). With the addition of INPs into the solution, the constitutional supercooling is controlled, and thermal gradients occur at the freezing front with the release of latent heat. Therefore, these temperature-related mechanisms might also be the reason for the alteration of macroscopic crystal morphology by INPs. Besides the temperature factor, the molecular chemistry aspect of ice nucleation agents might also lead to the development of lamellar ice morphology. During the molecular simulation study to understand heterogeneous ice nucleation, the clay mineral kaolinite was used as the model ice nucleating agent and was found to promote the growth of the prism plane over the basal plane, which was suggested to be able to further influence the macroscopic ice crystal structure (Cox, Raza, Kathmann, Slater, & Michaelides, 2013). In addition, a previous study conducted by Nada et al. demonstrated the selective binding of Xanthomonas campestris INPs to the basal plane of ice crystal, leading to a faster growth rate of ice crystal in the prism face (Nada, Zepeda, Miura, & Furukawa, 2010). Thus, the mechanism for the lamellar structure developed by INPs might be the effect of INPs on the nucleation temperature and/or molecular growth of ice crystals.

For freeze drying, ice morphology is also important for product quality control. The batch homogeneity is an important issue during the scale-up process development and thus INPs might also help improve the product consistency with narrow ice crystal size distribution and similar crystal shape between each batch (Nakagawa, Hottot, Vessot, & Andrieu, 2007). This study demonstrates that with the increase of INP concentration, ice morphology of frozen samples develops from a coarse lamellar structure with partially aligned columnar crystals into a well oriented and well-defined lamellar structure. This suggests that it is possible to control the growth of lamellar ice structure during freezing with different INP concentrations. In material science, such transition between randomly oriented ice crystals and lamellar ones might be a big interest. So, the application of INPs might provide an effective approach for material preparations by techniques like ice-templating, especially when continuous porosity is desired.

The effect of INPs on the freeze-drying efficiency of different liquid systems, including 5% BSA solution, coffee and milk, is also examined. BSA was chosen as the model for products containing proteins. Milk and coffee were selected as they are commonly freeze-dried in food industry. As shown in FIG. 21, INPs were able to increase the primary drying rate in the liquid systems of BSA solution, milk and coffee as compared to control samples under the same freezing temperature of −18° C. The improvement was more significant when the solutions were frozen at −8° C. with INPs, when controls were unable to freeze. At −8° C., the primary drying rate was increased by 28%, 11% and 15% for BSA, coffee and milk respectively, as compared to control samples frozen at −18° C. By freezing at −8° C. instead of −18° C., the energy cost can be significantly reduced for the freezing step as well. The results suggest that INPs can improve the efficiency of freeze drying in liquid systems with different compositions, strongly indicating their applications to a wide range of food product categories. The pore structure in the freeze-dried cakes of different food systems also showed evidence of lamellar ice structure along the growth direction as well as the cross section. Such morphology observation in different systems suggests that the ice morphology alteration by INPs is also very likely to be the major reason for the efficiency improvement. This also indicates that such ice morphology alteration by INPs is independent with the solute inside the liquid system.

Thus, specific methods and compositions of matter have been disclosed that improve the efficiency of freeze related separation processes. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In addition, the references listed herein are also part of the application and are incorporated by reference in their entirety as if fully set forth herein.

Further description of the disclosed method and apparatus is included in the Appendix which is part of the application and is incorporated by reference in its entirety as if fully set forth herein. The Appendix comprises papers entitled "Improved freeze drying efficiency by ice nucleation proteins with ice morphology modification", and "A Novel Approach To Improve the Efficiency of Block Freeze Concentration Using Ice Nucleation Proteins with Altered Ice Morphology." In addition, the references listed herein and in the appended material are also part of the application and are incorporated by reference in their entirety as if fully set forth herein.

What is claimed is:

1. A method for freeze-related separation, comprising the steps of:
providing a first material comprising water;
combining the first material with a predetermined amount of at least one biogenic ice nucleation protein;
at least partially freezing the combination to form at least one ice crystal; and
separating the at least one ice crystal from the at least partially frozen combination,
wherein freezing conditions and the predetermined amount of the at least one biogenic ice nucleation protein are selected such that the aqueous solution, upon freezing, forms a lamellar ice crystal structure having at least one property selected from the group consisting of a solute inclusion volume at least 30% smaller than in the first material alone, a hydraulic diameter at least 30% larger than in the first material alone, an inclusion width that is less than 10% of a crystal dimension, a hydraulic diameter that is less more than 1.5 times that of an inclusion width. a deviation of crystal orientation angle in the transverse direction of less than 45 degrees, an ice crystal length in the transverse direction that is at least 10% larger than in the first material alone, and a length of the ice crystal structure in the longitudinal direction that is at least 10% larger than in the first material alone.

2. The method according to claim 1, wherein the predetermined amount of the at least one biogenic INP is selected to allow a freezing temperature that is at least 10 degrees C. higher than the freezing temperature without the at least one biogenic ice nucleation protein.

3. The method according to claim 1, wherein the first material is selected from the group consisting of milk, coffee, a fruit, a vegetable, salt water, a fruit juice, and a pharmaceutical composition.

4. The method according to claim 1, wherein the first material further comprises a solute.

5. The method according to claim 1, wherein the separating comprises centrifugation at from about 500 to about 1000 rpm.

6. The method according to claim 1, wherein the freeze-related separation process is a freeze-drying process and the separating comprises sublimation of the ice crystal structure.

7. The method according to claim 6, wherein the concentration of INPs and freezing conditions are selected such that the process utilizes at least one less cycle of freezing and separating than the process using the first material alone.

8. The method according to claim 1, wherein the ice crystal structure is a lamellar structure.

9. A lamellar ice crystal structure comprising:
water;
at least one solute; and
at least one biogenic ice nucleation protein having a concentration selected such that the lamellar ice crystal structure has at least one property selected from the group consisting of a solute inclusion volume at least 30% smaller than in a structure without the at least one biogenic ice nucleation protein, a hydraulic diameter at least 30% larger than in a structure without the at least one biogenic ice nucleation protein, an inclusion width that is less than 10% of a crystal dimension, a hydraulic diameter that is less more than 1.5 times that of an inclusion width, a deviation of crystal orientation angle in the transverse direction of less than 45 degrees, an ice crystal length in the transverse direction that is at least 10% larger than in a structure without the at least one biogenic ice nucleation protein, and a length of the ice crystal structure in the longitudinal direction that is at least 10% larger than in a structure without the at least one biogenic ice nucleation protein.

10. The lamellar ice crystal structure according to claim 9, wherein the solute is a salt.

11. A method as claimed in claim 1 for desalination, comprising the steps of:
providing an aqueous salt-containing solution;
providing a predetermined amount of at least one biogenic ice nucleation protein selected to increase a freezing temperature. sufficient to yield an n-cycle process when combined with the aqueous solution, where n is the number of cycles required to alter the starting concentration to at least a predetermined level.

12. The method according to claim 11, wherein the amount of the at least one biogenic ice nucleation protein is selected such that the aqueous solution, upon freezing, forms a lamellar ice crystal structure having at least one property selected from the group consisting of a solute inclusion volume at least 30% smaller than in the first material alone, a hydraulic diameter at least 30% larger than in the first material alone, an inclusion width that is less than 10% of a crystal dimension, a hydraulic diameter that is less more than. 1.5 times that of an inclusion width, a deviation of crystal orientation angle in the transverse direction of less than 45 degrees, an ice crystal length in the transverse direction that is at least 10% larger than in the first material alone, and a length of the ice crystal structure in the longitudinal direction that is at least 10% larger than in the first material alone.

13. The method according to claim 11, wherein the freezing temperature is at least 10 degrees C. higher than the freezing temperature without the at least one biogenic ice nucleation protein.

14. A method as claimed in claim 1 for desalination, comprising the steps of:
providing an aqueous salt-containing solution;
providing a predetermined amount of at least one biogenic ice nucleation protein selected to produce an ice morphology sufficient to yield an n-cycle process when combined with the aqueous solution, where n is the number of cycles required to alter the starting concentration to at least a predetermined level; and
supercooling the combination of the aqueous solution and the at least one biogenic ice nucleation protein.

15. The method according to claim 14, wherein the predetermined amount of the at least one biogenic ice nucleation protein are selected such that the aqueous solution, upon freezing, forms a lamellar ice crystal structure having at least one property selected from the group consisting of a solute inclusion volume at least 30% smaller than in the first material alone, a hydraulic diameter at least 30% larger than in the first material alone, an inclusion width that is less than 10% of a crystal dimension, a hydraulic diameter that is less more than 1.5 times that of an inclusion width, a deviation of crystal orientation angle in the transverse direction of less than 45 degrees, an ice crystal length in the transverse direction that is at least 10% larger than in the first material alone, and a length of the ice crystal structure in the longitudinal direction that is at least 10% larger than in the first material alone.

16. The method according to claim 14, further comprising removing at least one ice crystal structure from the aqueous solution.

17. The method according to claim 16, further comprising repeating the cycle of freezing and separating steps until the concentration in at least one of the solute in the ice crystal structure or solute in the aqueous solution has reached a desired concentration.

18. The method according to claim 17, wherein the total number of cycles is at least one less than total number of cycles required to Concentrate the solute to the same concentration without the use of a biogenic ice nucleation protein.

19. A method for freeze-drying, comprising the steps of:
combining a first material comprising water with a predetermined amount of at least one biogenic ice nucleation protein;
freezing the combination; and
drying the combination by removing the frozen water via sublimation..

20. The method according to claim 19, wherein the predetermined amount of the at least one biogenic ice nucleation protein are selected such that the combination, upon freezing, forms a lamellar ice crystal structure having at least one property selected from the group consisting of a solute inclusion volume at least 30% smaller than in the first material alone, a hydraulic diameter at least 30% larger than in the first material alone, an inclusion width that is less than 10% of a crystal dimension, a hydraulic diameter that is less more than 1.5 times that of an inclusion width, a deviation of crystal orientation angle in the transverse direction of less than 45 degrees, an ice crystal length in the transverse direction that is at least 10% larger than in the first material alone, and a length of the ice crystal structure in the longitudinal direction that is at least 10% larger than in the first material alone.

21. The method according to claim 19, wherein the first material is selected from the group consisting of milk, coffee, a fruit, a vegetable and a pharmaceutical composition.

* * * * *